(12) United States Patent
Tolstoy et al.

(10) Patent No.: US 10,430,119 B2
(45) Date of Patent: Oct. 1, 2019

(54) MECHANISM FOR MULTIPLE COEXISTING CONFIGURATIONS SUPPORT IN VIRTUAL TAPE APPLICATIONS

(71) Applicant: EMC IP Holding Company LLC, Hopkinton, MA (US)

(72) Inventors: Mikhail Tolstoy, Saint Petersburg (RU); Roman Kupriyanov, Saint Petersburg (RU); Karyn Kelley, Peaboy, MA (US); Larry McCloskey, Billerica, MA (US); Igor Matveevskiy, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/193,525

(22) Filed: Nov. 16, 2018

(65) Prior Publication Data

US 2019/0087131 A1 Mar. 21, 2019

Related U.S. Application Data

(63) Continuation of application No. 15/639,396, filed on Jun. 30, 2017, now Pat. No. 10,146,479.

(51) Int. Cl.
*G06F 3/06* (2006.01)

(52) U.S. Cl.
CPC .......... *G06F 3/0664* (2013.01); *G06F 3/0604* (2013.01); *G06F 3/0629* (2013.01); *G06F 3/0686* (2013.01); *G06F 3/0601* (2013.01)

(58) Field of Classification Search
None
See application file for complete search history.

(56) References Cited

U.S. PATENT DOCUMENTS

| | | |
|---|---|---|
| 7,162,604 B1 * | 1/2007 | Nourmohamadian ...................... G06F 3/0607 711/111 |
| 7,302,540 B1 | 11/2007 | Holdman et al. |
| 7,620,765 B1 | 11/2009 | Ohr et al. |
| 8,291,183 B2 | 10/2012 | McCloskey et al. |
| 8,458,422 B1 | 6/2013 | Holdman et al. |
| 8,667,239 B1 | 3/2014 | McCloskey et al. |
| 8,775,756 B1 | 7/2014 | McCloskey et al. |
| 8,793,452 B1 | 7/2014 | McCloskey et al. |
| 8,924,682 B1 | 12/2014 | McCloskey et al. |
| 9,009,443 B2 | 4/2015 | Haustein et al. |
| 9,207,877 B1 | 12/2015 | McCloskey et al. |
| 9,436,591 B1 | 9/2016 | McCloskey et al. |
| 9,471,233 B1 | 10/2016 | Goodwin-Jette et al. |
| 9,552,370 B1 | 1/2017 | McCloskey et al. |
| 9,582,207 B1 | 2/2017 | McCloskey et al. |

(Continued)

*Primary Examiner* — Brian R Peugh
(74) *Attorney, Agent, or Firm* — Chamberlain, Hrdlicka, White, Williams & Aughtry

(57) ABSTRACT

A mechanism for multiple coexisting configurations support in virtual tape applications. Specifically, the introduction of various additional computer processes facilitate the introduction or modification of user specific configurations on a virtual tape solution: (i) without requiring the shutdown and re-initialization of the virtual tape solution; and (ii) without compromising the performance of computing resources allocated towards the implementation of other user specific configurations already existing on the virtual tape solution.

20 Claims, 20 Drawing Sheets

(56) References Cited

U.S. PATENT DOCUMENTS

| | | |
|---|---|---|
| 10,126,969 B1 | 11/2018 | Tolstoy et al. |
| 2004/0034811 A1 | 2/2004 | Trimmer et al. |
| 2005/0033911 A1 | 2/2005 | Kitamura et al. |
| 2006/0123208 A1 | 6/2006 | Johnson |
| 2007/0103984 A1 | 5/2007 | Kavuri et al. |
| 2008/0162813 A1* | 7/2008 | Haustein .............. G06F 3/0613 711/115 |
| 2008/0222344 A1 | 9/2008 | Upadhyayula |
| 2008/0301363 A1 | 12/2008 | Kitamura et al. |
| 2010/0086135 A1 | 4/2010 | Wideman et al. |
| 2010/0185813 A1 | 7/2010 | Muroyanna |
| 2012/0198146 A1 | 8/2012 | Hostetter et al. |
| 2012/0284555 A1 | 11/2012 | Akirav et al. |
| 2015/0154085 A1 | 6/2015 | Iwasaki et al. |

* cited by examiner

MECHANISM FOR MULTIPLE COEXISTING CONFIGURATIONS SUPPORT IN VIRTUAL TAPE APPLICATIONS

CROSS-REFERENCE TO RELATED APPLICATIONS

This application is a continuation application of U.S. patent application Ser. No. 15/639,396, filed on Jun. 30, 2017, and entitled: "MECHANISM FOR MULTIPLE COEXISTING CONFIGURATIONS SUPPORT IN VIRTUAL TAPE APPLICATIONS." Accordingly, this application claims benefit of U.S. patent application Ser. No. 15/639,396 under 35 U.S.C. § 120. U.S. patent application Ser. No. 15/639,396 is hereby incorporated by reference in its entirety.

BACKGROUND

The implementation of mainframe user specific configurations, by way of the configuration of virtual tape drives and virtual tape libraries for use by mainframe applications, is presently a disruptive process requiring the restarting of at least the server on which the virtual tape drives and virtual tape libraries reside.

BRIEF DESCRIPTION OF DRAWINGS

FIGS. 5A-5I show flowcharts describing a method for modifying an existing user specific configuration non-disruptively in accordance with one or more embodiments of the invention.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-7, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a mechanism for multiple coexisting configurations support in virtual tape applications. Specifically, one or more embodiments of the invention entail the introduction of various additional computer processes to facilitate the introduction or modification of user specific configurations on a virtual tape solution: (i) without requiring the shutdown and re-initialization of the virtual tape solution; and (ii) without compromising the performance of computing resources allocated towards the implementation of other user specific configurations already existing on the virtual tape solution.

Figure 1:
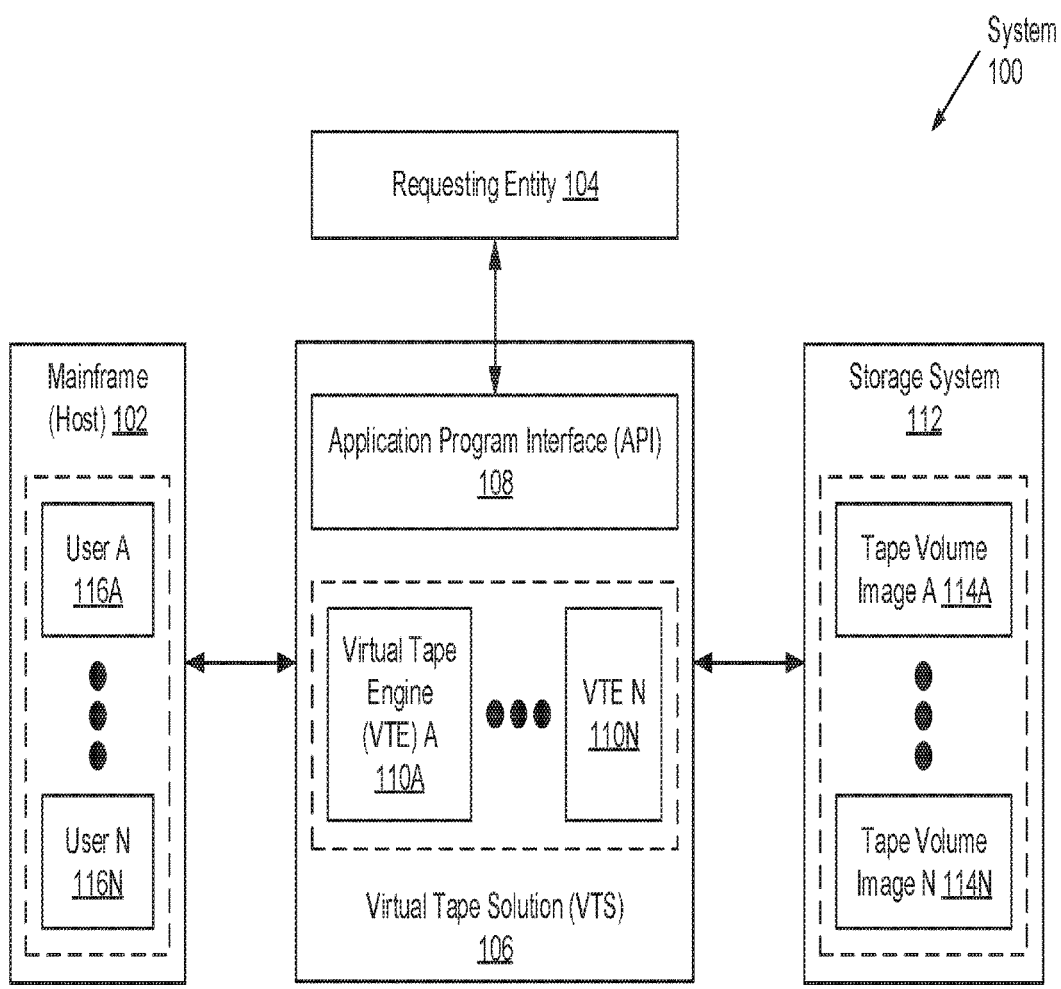
FIG. 1 shows a system in accordance with one or more embodiments of the invention.

FIG. 1 shows a system in accordance with one or more embodiments of the invention. The system (100) includes a virtual tape solution (VTS) (106) operatively connected to a mainframe (102), a requesting entity (104), and a storage system (112). Each of these components is described below.

In one embodiment of the invention, the aforementioned components may be directly or indirectly connected to each other using any combination of wired or wireless connections. In embodiments in which the aforementioned components are indirectly connected to one another, there may be other network infrastructure components or systems (e.g., switches, routers, servers, etc.) (not shown) that facilitate communication between the aforementioned components. Moreover, the aforementioned components may communicate with each other using any combination of wired and/or wireless communication protocols.

In one embodiment of the invention, the VTS (106) may be a disk-based data backup and archiving platform for the mainframe (102). The VTS (106) may include an application program interface (API) (108) and a set of one or more virtual tape engines (VTEs) (110A-110N). In one embodiment of the invention, the API (108) may provide a specification for the exchange of information between the VTS (106) and the requesting entity (104), or the VTS (106) and the mainframe (102). For example, the API (108) may establish that the exchange of information entails a request for processing and a return of a response based on the outcome of the processing (see e.g., FIGS. 4A-5I). In one embodiment of the invention, the API (108) may include logic dedicated towards the delegation of received requests to an appropriate VTE (110A-110N). To that end, the API (108) may include functionality to search and update locally-stored data structures (not shown), which may be used to store/map which VTE (110A-110N) is emulating which tape drive and/or defining which tape library (see e.g., FIG. 2). Further, the API (108) may be implemented using hardware, software, firmware, or any combination thereof. By way of one example, the API (108) may be a web API accessed through a webpage and a wide area network (WAN) (or Internet) connection.

In one embodiment of the invention, a VTE (110A-110N) may be a server on which one or more tape drives (described below) may be emulated and one or more tape libraries (described below) may be defined. Specifically, a VTE (110A-110N) may be a physical computing system programmed to: (i) receive and process requests concerning tape drives and/or tape libraries; (ii) add, remove, or re-configure one or more tape drives or tape libraries non-disruptively based on the requests; and (iii) generate and send responses to the requests based on the outcome of their processing. In one embodiment of the invention, the addition, removal, and/or reconfiguration of tape drives and/or tape libraries non-disruptively may refer to the performance of such actions without requiring the shutdown and restarting of the VTS (106). VTEs (110A-110N) are described in further detail below with respect to FIG. 2.

In one embodiment of the invention, the mainframe (102) may be any computing system (see e.g., FIG. 7) used for various applications. These applications may, for example, require large-scale and complex data processing. Further, the mainframe (102) may be any computing system that may serve multiple users (116A-116N) concurrently. The mainframe (102) may be programmed to provide and manage the allocation of computing resources for use by the various executing processes (e.g., tasks) instantiated by the one or more users (116A-116N). Further, the mainframe (102) may include functionality to submit input/output (I/O) requests to the VTS (106). The I/O requests may include, but are not limited to, requests to write data to a virtual tape drive (not shown) and requests to read data from the virtual tape drive.

In one embodiment of the invention, the requesting entity (104) may be any type of computing system (see e.g., FIG. 7) programmed to interact with the VTS (106). Specifically, the requesting entity (104) may include functionality to: (i) submit requests concerning one or more tape drives and/or tape libraries to the VTS (106); and (ii) receive responses, from the VTS (106), based on the outcome of the processing of the requests. By way of examples, the requesting entity (104) may be a desktop computer, a laptop computer, a smartphone, or a tablet computer operated by a network, datacenter, and/or mainframe administrator.

In one embodiment of the invention, the storage system (112) may be a back-end data repository implemented using any type of storage unit and/or device (e.g., a file system, database, collection of tables, or any other storage mechanism). The storage system (112) may be implemented using multiple storage units and/or devices, which may or may not be of the same type or located at the same physical site. In one embodiment of the invention, the storage system (112) includes functionality to store one or more tape volume images (114A-114N). A tape volume image (114A-114N) may represent, for example, a single file in a file system, or a single record in a database. Further, each tape volume image (114A-114N) may cache short-retention data and/or consolidate long-retention data used and/or generated by the various processes (e.g., tasks) which may be executing on the mainframe (102). In one embodiment of the invention, the storage system (112) may include functionality to manipulate the storage of the tape volume images (114A-114N) by way of providing, for example, the deduplication, compression, encryption, etc., of data. In one embodiment of the invention, the storage system (112) includes persistent storage (not shown). Examples of persistent storage hosted on the storage system (112) include, but are not limited to, optical storage, magnetic storage, NAND Flash memory, NOR Flash memory, Magnetic RAM memory (M-RAM), Spin Torque Magnetic RAM memory (ST-MRAM), Phase Change memory (PCM), and any other memory defined as a non-volatile Storage Class memory (SCM).

While FIG. 1 shows a configuration of components, other system configurations may be used without departing from the scope of the invention. For example, embodiments of the invention may be implemented using multiple instances of each component. Specifically, one set of components (including at least a mainframe, a VTS, and a storage system) may function as a primary system, whereas another set of components may function as a secondary or backup system activated once the primary system experiences failover.

Figure 2:
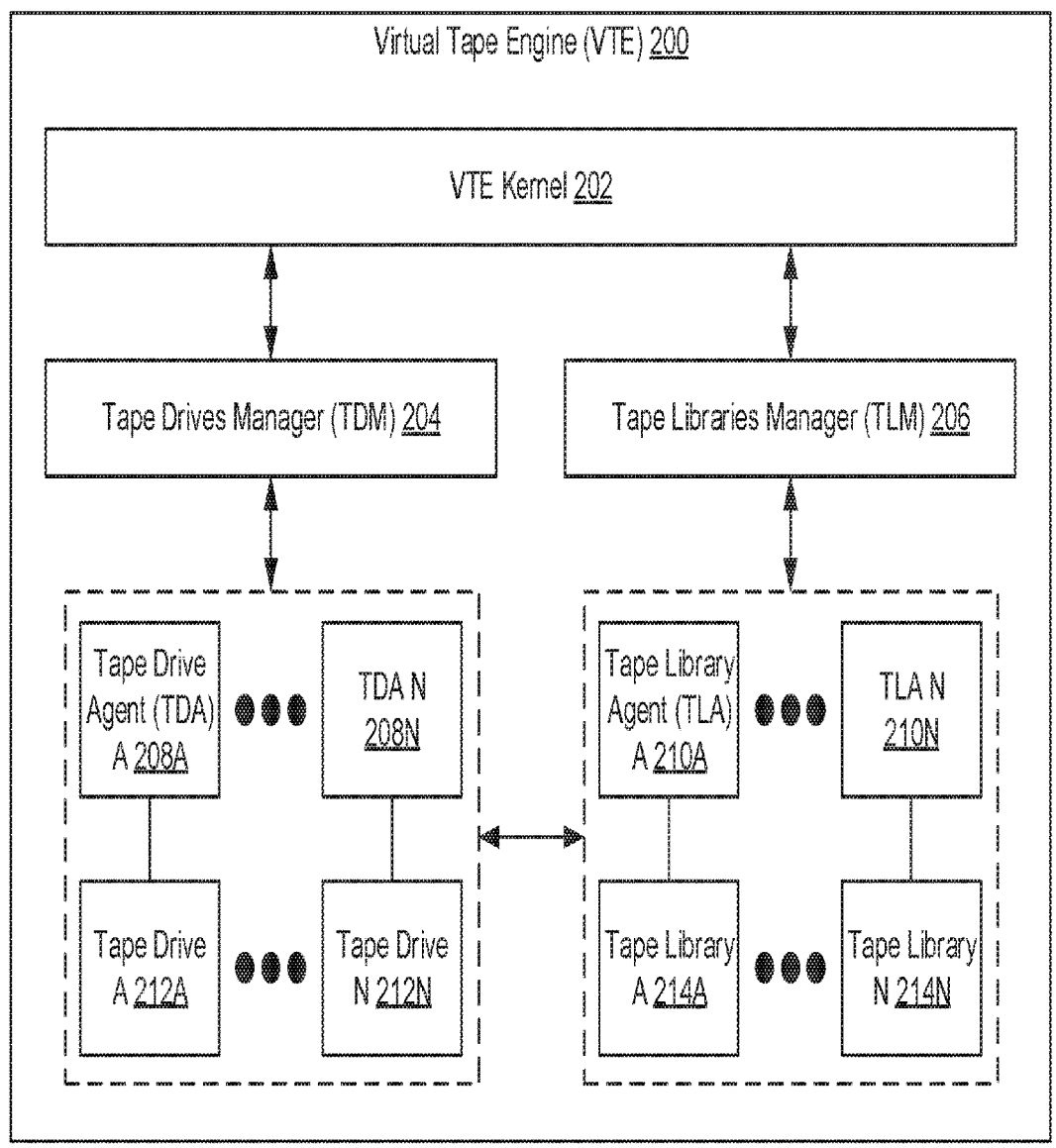
FIG. 2 shows a virtual tape engine in accordance with one or more embodiments of the invention.

FIG. 2 shows a virtual tape engine (VTE) in accordance with one or more embodiments of the invention. A VTE (200) includes a VTE kernel (202) operatively connected to a tape drives manager (TDM) (204) and a tape libraries manager (TLM) (206). The TDM (204) may be operatively connected to and responsible for one or more tape drive agents (TDAs) (208A-208N). Each TDA (208A-208N) may be operatively connected and responsible for one and only one emulated tape drive (212A-212N). Further, the TLM (206) may be operatively connected to and responsible for one or more tape library agents (TLAs) (210A-210N). Each TLA (210A-210N) may be operatively connected and responsible for one and only one tape library (214A-214N). Each of these components is described below.

In one embodiment of the invention, the VTE kernel (202) may be a core or central computer program executing on the VTE (200). The VTE kernel (202) includes functionality to: (i) receive and interpret requests relayed by the VTS API (see e.g., FIG. 1) from a requesting entity; (ii) delegate requests pertaining to the configuration of tape drives (212A-212N) to the TDM (204); (iii) delegate requests pertaining to the configuration of tape libraries (214A-214N) to the TLM (206); and (iv) receive and relay request reports (i.e., indicating the outcome of the received requests) from the TDM (204) or TLM (206) to the VTS API.

In one embodiment of the invention, the TDM (204) may be a computer process (or an instance of a computer program executing on the VTE (200)). Specifically, the TDM (204) may be a computer process dedicated towards the management of the one or more TDAs (208A-208N) which may be executing on the VTE (200). With respect to TDA management, the TDM (204) includes functionality to: (i) create and delete TDAs (208A-208N); (ii) create tape drives (212A-212N); (iii) assign TDAs (208A-208N) to tape drives (212A-212N); (iv) search and update the drive control table (DCT) (see e.g., FIG. 3A), which stores mappings identifying which TDA (208A-208N) may be managing which tape drive (212A-212N); (v) receive requests concerning the configuration (e.g., addition, removal, or modification) of one or more tape drives (212A-212N) which may be delegated from the VTE kernel (202); and (vi) generate and provide request reports, outlining the outcomes of the processed requests, to the VTE kernel (202).

In one embodiment of the invention, the TLM (206) may be a computer process (or an instance of a computer program executing on the VTE (200)). Specifically, the TLM (206) may be a computer process dedicated towards the management of the one or more TLAs (210A-210N) which may be executing on the VTE (200). With respect to TLA management, the TLM (206) includes functionality to: (i) create and delete TLAs (210A-210N); (ii) create tape libraries (214A-214N); (iii) assign TLAs (210A-210N) to tape libraries (214A-214N); (iv) search and update the library control table (LCT) (see e.g., FIG. 3B), which stores mappings identifying which TLA (210A-210N) may be managing which tape library (214A-214N); (v) receive requests concerning the configuration (e.g., addition, removal, or modification) of one or more tape libraries (214A-214N) which may be delegated from the VTE kernel (202); and (vi) generate and provide request reports, outlining the outcomes of the processed requests, to the VTE kernel (202).

In one embodiment of the invention, a TDA (208A-208N) may be a computer process (or an instance of a computer program executing on the VTE (200)). Specifically, a TDA (208A-208N) may be a computer process dedicated towards the management of one of the one or more tape drives (212A-212N) emulated on the VTE (200). With respect to tape drive management, a TDA (208A-208N) includes functionality to: (i) manage the life cycle of the managed tape drive (212A-212N); (ii) ready the managed tape drive (212A-212N) for deletion, when commanded, by (a) cleaning up the managed tape drive (212A-212N) and (b) setting a current usage state of the managed tape drive (212A-212N) to a dead state after the cleaning up; and (iii) update the management information (i.e., at least a portion of a tape drive configuration (TDC)) associated with the managed tape drive (212A-212N).

In one embodiment of the invention, a TDC may include, but is not limited to: (i) a tape library ID associated with a virtual tape library to which the virtual tape drive points (i.e., accesses); (ii) a media access control (MAC) address and/or Internet Protocol (IP) address assigned to the virtual tape drive; (iii) drive type information detailing the specifications for the physical tape drive model the virtual tape drive is to be emulating; and (iv) a set of parameters defining the behavior of the virtual tape drive. Further, in one embodiment of the invention, cleaning up a managed tape drive (212A-212N) may include, but is not limited to, the execution of the following processes: (i) the freeing up (or deallocation) of memory allocated to the managed tape drive (212A-212N); (ii) the refreshing of tape library references counter; and (iii) the dumping of statistics related to the managed tape drive (212A-212N).

In one embodiment of the invention, a TLA (210A-210N) may be a computer process (or an instance of a computer program executing on the VTE (200)). Specifically, a TLA (210A-210N) may be a computer process dedicated towards the management of one of the one or more tape libraries (214A-214N) defined on the VTE (200). With respect to tape library management, a TLA (210A-210N) includes functionality to: (i) manage the life cycle of the managed tape library (214A-214N); (ii) remove/delete the managed tape library (214A-214N) in response to a shutdown command (discussed below); and (iii) update management information (i.e., at least a portion of library management information (LMI)) associated with the managed tape library (214A-214N).

In one embodiment of the invention, LMI may include, but is not limited to: (i) the storage location in the storage system (see e.g., FIG. 1) wherein tape volume images forming the tape library resides; (ii) the mount point or directory in the VTE wherein the tape library resides; (iii) the classification of the tape library as designated by the requesting entity; (iv) metadata associated with the tape library and/or the contents or data to which the tape library organizes; and (v) a configuration specifying the enablement or disablement of storage system features (e.g., deduplication, replication, encryption, compression, etc.) describing how data organized by the tape library would be stored.

In one embodiment of the invention, a tape drive (212A-212N) may be an emulation of physical tape hardware. Accordingly, a tape drive (212A-212N) may be a software construct (e.g., a virtual machine) that implements physical tape drive functionality. Physical tape drive functionality may include, but is not limited to, the reading and writing of data used and/or generated by the mainframe to the storage system (see e.g., FIG. 1).

In one embodiment of the invention, a tape library (214A-214N) may be a single file system within which one or more tape volume images (see e.g., FIG. 1) may be mounted. As a file system, a tape library (214A-214N) may store identifiers and/or address locations in memory or non-transitory computer readable media (e.g., the storage system (see e.g., FIG. 1)) within which data (i.e., tape volume images) may be consolidated.

Figure 3A:
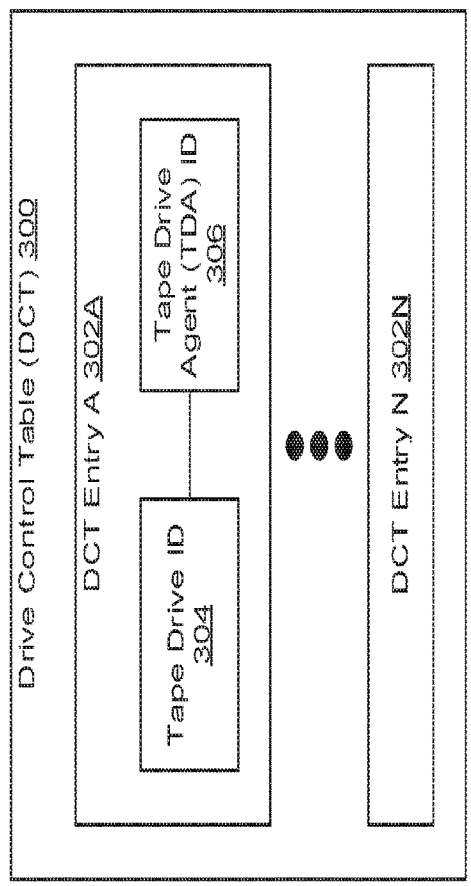
FIG. 3A shows a drive control table in accordance with one or more embodiments of the invention.

FIG. 3A shows a drive control table (DCT) in accordance with one or more embodiments of the invention. The DCT (300) may be a database that includes entries, which include mappings between an emulated tape drive and a TDA. Specifically, in one embodiment of the invention, a mapping between an emulated tape drive and a TDA may be used to identify which TDA is responsible for managing which emulated tape drive within a VTE. In view of this, the DCT (300) includes one or more DCT entries (302A-302N). In one embodiment of the invention, a DCT entry (302A-302N) may be programmed by the TDM based on the allocation or deallocation of emulated tape drives and/or corresponding TDAs. That is to say, the DCT (300) may be updated in response to the addition, deletion, and/or reconfiguration of emulated tape drives.

In one embodiment of the invention, each of the one or more DCT entries (302A-302N) includes a tape drive ID (304). A tape drive ID (304) may be a string of characters (e.g., letters, numbers, symbols, etc.) that is used to identify a tape drive emulated on a VTE. The tape drive ID (304) may be automatically generated when a tape drive is created/added, may be chosen or selected when the tape drive is created/added, and may be changed any time after the tape drive is created/added. In another embodiment of the invention, the tape drive ID (304) may be a unique identifier of the emulated tape drive, which distinguishes the emulated tape drive uniquely from other emulated tape drives. In such an embodiment, the tape drive ID (304) may be based on a unique identifier of the underlying host (i.e., the VTE or server) on which the emulated tape drive is executing. Further, in such an embodiment, the tape drive ID (304) may be rarely changed or modified for the life of the emulated tape drive. As such, the tape drive ID (304) may be of any length and may contain any combination of characters that allow an emulated tape drive to be uniquely identified. By way of an example, a tape drive ID (304) may be an alphanumeric tag given by an administrator, or may be a N-bit integer (where N>0) expressed in hexadecimal notation and generated by the TDM.

In one embodiment of the invention, each of the one or more DCT entries (302A-302N) further includes a TDA ID (306). A TDA ID (306) may be a string of characters (e.g., letters, numbers, symbols, etc.) that is used to identify a TDA executing on a VTE. The TDA ID (306) may be automatically generated when a TDA is created, may be chosen or selected when the TDA is created, and may be changed any time after the TDA is created. In another embodiment of the invention, the TDA ID (306) may be a unique identifier of the TDA, which distinguishes the TDA from other TDAs executing on a VTE. In such an embodiment, the TDA ID (306) may be based on a unique identifier of the underlying host (i.e., the VTE or server) on which the TDA is executing. Further, in such an embodiment, the TDA ID (306) may be rarely changed or modified for the life of the TDA. As such, the TDA ID (306) may be of any length and may contain any combination of characters that allow a TDA to be uniquely identified. By way of an example, a TDA ID (306) may be an alphanumeric tag given by an administrator, or may be a N-bit integer (where N>0) expressed in hexadecimal notation and generated by the TDM.

Additional and/or alternative information may be included in a DCT entry (302A-302N) without departing from the scope of the invention. For example, the one or more DCT entries (302A-302N) may further include a VTE ID, which may identify the VTE on which the emulated tape drive is executing and, accordingly, may also uniquely distinguish the VTE from other VTEs executing in the VTS.

Figure 3B:
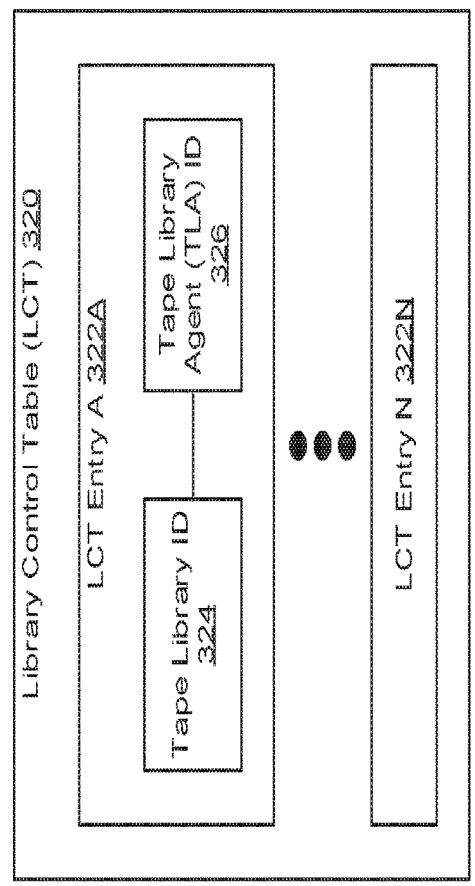
FIG. 3B shows a library control table in accordance with one or more embodiments of the invention.

FIG. 3B shows a library control table (LCT) in accordance with one or more embodiments of the invention. The LCT (320) may be a database that includes entries, which include mappings between a tape library and a TLA. Specifically, in one embodiment of the invention, a mapping between a tape library and a TLA may be used to identify which TLA is responsible for managing which tape library in a VTE. In view of this, the LCT (320) includes one or more LCT entries (322A-322N). In one embodiment of the invention, a LCT entry (322A-322N) may be programmed by the TLM based on the allocation or deallocation of tape libraries and/or corresponding TLAs. That is to say, the LCT (320) may be updated in response to the addition, deletion, and/or reconfiguration of tape libraries.

In one embodiment of the invention, each of the one or more LCT entries (322A-322N) includes a tape library ID (324). A tape library ID (324) may be a string of characters (e.g., letters, numbers, symbols, etc.) that is used to identify a tape library. The tape library ID (324) may be automatically generated when a tape library is created/added, may be chosen or selected when the tape library is created/added, and may be changed any time after the tape library is created/added. In another embodiment of the invention, the tape library ID (324) may be a unique identifier of the tape library, which distinguishes the tape library uniquely from other tape libraries executing on a VTE. In such an embodiment, the tape library ID (324) may be based on a unique identifier of the underlying host (e.g., the VTE or server) on which the tape library is executing. Further, in such an embodiment, the tape library ID (324) may be rarely changed or modified for the life of the tape library. As such, the tape library ID (324) may be of any length and may contain any combination of characters that allows a tape library to be uniquely identified. By way of an example, a tape library ID (324) may be an alphanumeric tag given by an administrator, or may be a N-bit integer (where N>0) expressed in hexadecimal notation and generated by the TLM.

In one embodiment of the invention, each of the one or more LCT entries (322A-322N) further includes a TLA ID (326). A TLA ID (326) may be a string of characters (e.g., letters, numbers, symbols, etc.) that is used to identify a TLA. The TLA ID (326) may be automatically generated when a TLA is created, may be chosen or selected when a TLA is created, and may be changed any time after the TLA is created. In another embodiment of the invention, the TLA ID (326) may be a unique identifier of the TLA, which distinguishes the TLA from other TLAs executing on a VTE. In such an embodiment, the TLA ID (326) may be based on a unique identifier of the underlying host (e.g., the VTE or server) on which the TLA is executing. Further, in such an embodiment, the TLA ID (326) may be rarely changed or modified for the life of the TLA. As such, the TLA ID (326) may be of any length and may contain any combination of characters that allows a TLA to be uniquely identified. By way of an example, a TLA ID (326) may be an alphanumeric tag given by an administrator, or may be a N-bit integer (where N>0) expressed in hexadecimal notation and generated by the TLM.

Additional and/or alternative information may be included in a LCT entry (322A-322N) without departing from the scope of the invention. For example, the one or more LCT entries (322A-322N) may further include a VTE ID, which may identify the VTE on which the tape library is executing and, accordingly, may also uniquely distinguish the VTE from other VTEs executing in the VTS.

Figure 3C:
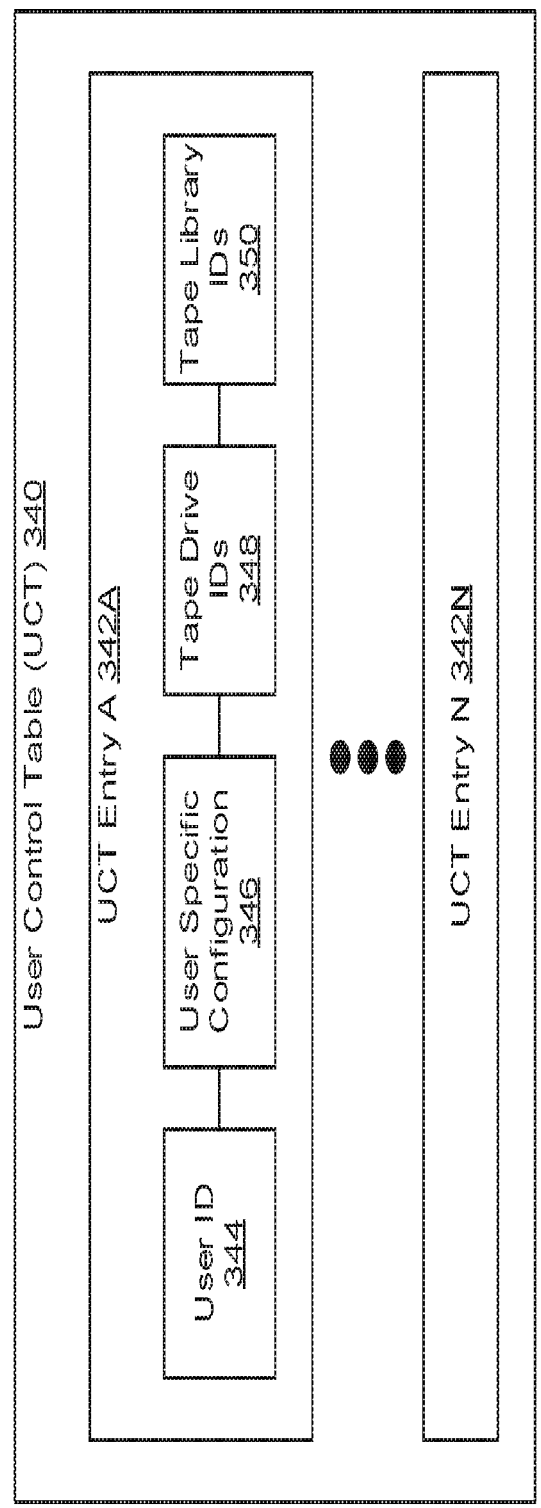
FIG. 3C shows a user control table in accordance with one or more embodiments of the invention.

FIG. 3C shows a user control table (UCT) in accordance with one or more embodiments of the invention. The UCT (340) may be a database that includes entries, which include mappings between a user, tape drives, and tape libraries. Specifically, in one embodiment of the invention, a mapping between a user, tape drives, and tape libraries may be used to identify which emulated tape drives and which defined tape libraries in a VTE have been allocated for which user. In view of this, the UCT (340) includes one or more UCT entries (342A-342N). In one embodiment of the invention, a UCT entry (342A-342N) may be programmed by the VTS API based on the allocation or deallocation of tape drives and tape libraries based on user specific configurations (described below). That is to say, the UCT (340) may be updated in response to the addition and/or reconfiguration of user specific configurations, which in turn entail the addition, deletion, and/or reconfiguration of tape drives and tape libraries.

In one embodiment of the invention, each of the one or more UCT entries (342A-342N) includes a user ID (344). A user ID (344) may be a string of characters (e.g., letters, numbers, symbols, etc.) that is used to identify a user of the mainframe (see e.g., FIG. 1). The user ID (344) may be automatically generated when a new user is registered on the mainframe, may be chosen or selected when the new user is registered on the mainframe, and may be changed any time after the user is registered on the mainframe. In another embodiment of the invention, the user ID (344) may be a unique identifier of the mainframe user, which distinguishes the mainframe user uniquely from other mainframe users. In yet another embodiment of the invention, the user ID (344) may rarely be changed or modified for the life of the user's registration on the mainframe. As such, the user ID (344) may be of any length and may contain any combination of characters that allows a mainframe user to be uniquely identified. By way of an example, a user ID (344) may be an alphanumeric tag given by an administrator, or may be a N-bit integer (where N>0) expressed in hexadecimal notation and generated by the mainframe.

In one embodiment of the invention, each of the one or more UCT entries (342A-342N) further includes a user specific configuration (346). A user specific configuration may be a script, expressed in computer readable program code, which specifies the computing resources a mainframe user requires from a VTE to support the execution of various processes (i.e., tasks) on the mainframe. VTE computing resources that a user specific configuration specifies may include, but are not limited to, a number of tape drives requested to be allocated to the user and a number of tape libraries requested to be allocated to the user. Further, a user specific configuration may also include a tape drive configuration (TDC) for each tape drive the user specific configuration specifies. In one embodiment of the invention, a TDC may include, but is not limited to: (i) a tape library ID associated with a virtual tape library to which the virtual tape drive points (i.e., accesses); (ii) a media access control (MAC) address and/or Internet Protocol (IP) address assigned to the virtual tape drive; (iii) drive type information detailing the specifications for the physical tape drive model the virtual tape drive is to be emulating; and (iv) a set of parameters defining the behavior of the virtual tape drive.

In one embodiment of the invention, a user specific configuration may also include library management information (LMI) for each tape library the user specific configuration specifies. In one embodiment of the invention, LMI may include information pertaining to, but not limited to: (i) the storage location in the storage system (see e.g., FIG. 1) wherein tape volume images forming the tape library resides; (ii) the mount point or directory in the VTE wherein the tape library resides; (iii) the classification of the tape library as designated by the requesting entity; (iv) metadata associated with the tape library and/or the contents or data to which the tape library organizes; and (v) a configuration specifying the enablement or disablement of storage system features (e.g., deduplication, replication, encryption, compression, etc.) onto which data organized by the tape library would be stored.

In one embodiment of the invention, each of the one or more UCT entries (342A-342N) further includes one or more (i.e., a set of) tape drive IDs (348) and one or more (i.e., a set of) tape library IDs (350). Tape drive IDs (348) and tape library IDs (350) are discussed above with respect to FIG. 3A and FIG. 3B, respectively.

Additional and/or alternative information may be included in a UCT entry (342A-342N) without departing from the scope of the invention. For example, the one or more UCT entries (342A-342N) may further include a VTE ID, which may identify the VTE on which the one or more tape drives and tape libraries allocated to the mainframe user is executing, and accordingly, may also uniquely distinguish the VTE from other VTEs executing in the VTS.

FIGS. 4A-4E show flowcharts describing a method for introducing a new user specific configuration non-disruptively in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel. In one embodiment of the invention, the steps shown in FIGS. 4A-4E may be performed in parallel with any other steps shown in FIGS. 5A-5I without departing from the scope of the invention.

Figure 4A:
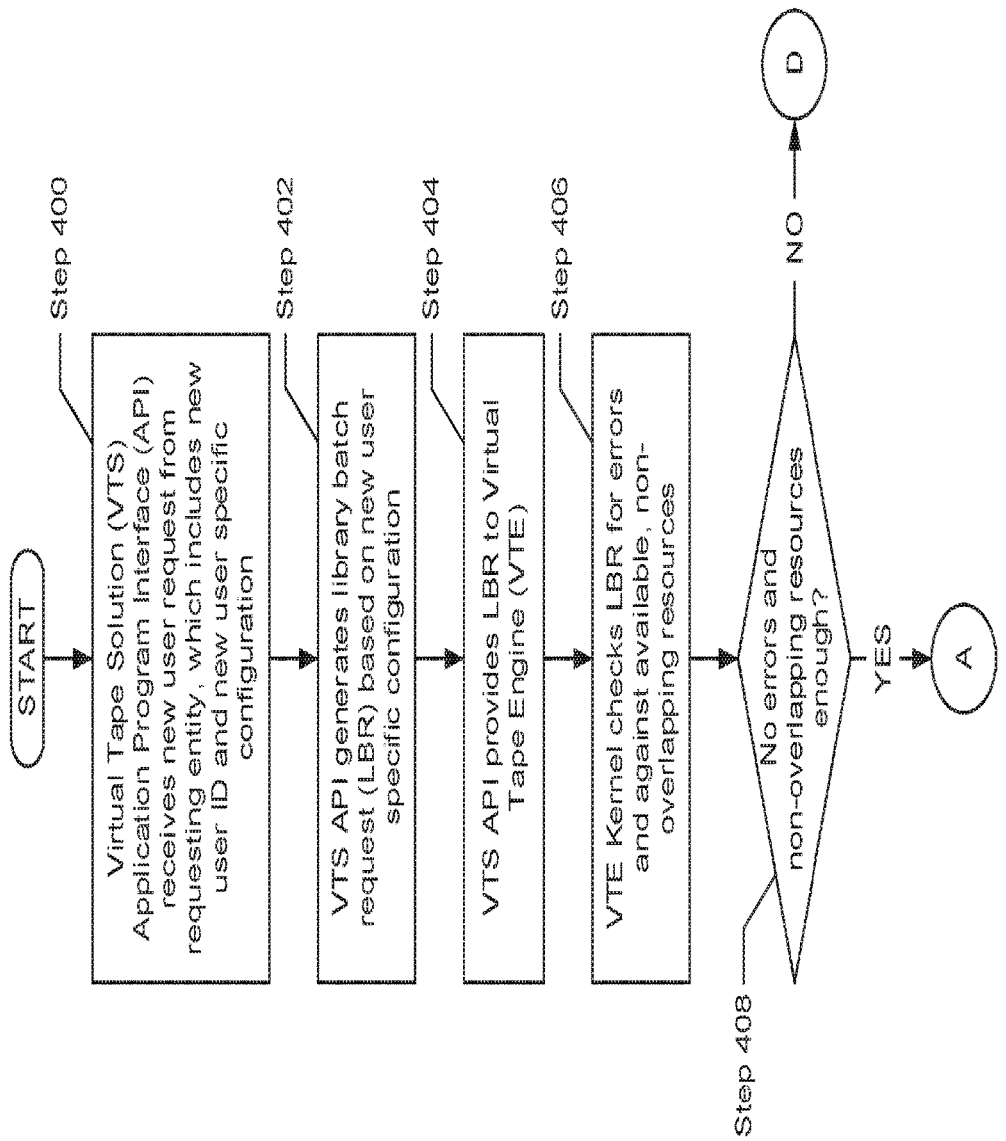
FIGS. 4A-4E show flowcharts describing a method for introducing a new user specific configuration non-disruptively in accordance with one or more embodiments of the invention.

Turning to FIG. 4A, in Step 400, the virtual tape solution (VTS), or more specifically, the VTS application program interface (API) receives a new user request from the requesting entity. In one embodiment of the invention, the new user request may pertain to the allocation of virtual tape engine (VTE) computing resources to support the execution of processes (i.e., tasks) instantiated by a new user on the mainframe. Subsequently, the new user request may include a new user ID associated with the new mainframe user and a new user specific configuration (described above).

In Step 402, the VTS API generates a library batch request (LBR) based on the new user specific configuration. In one embodiment of the invention, the LBR may include a set or series of one or more tape library addition requests. The number of tape library addition requests expressed in the LBR equals the number of tape libraries requested by the mainframe user by way of the new user specific configuration. For example, the new user specific configuration may request the allocation of 16 tape libraries. Accordingly, a set of 16 tape library addition requests may be generated to represent the LBR. Further, in one embodiment of the invention, each tape library addition request may pertain to the configuration of a different tape library, and thus, may include different library management information (LMI) specific to the tape library associated with the tape library addition request. Each LMI may include information pertaining to, but not limited to: (i) the storage location in the storage system (see e.g., FIG. 1) wherein tape volume images forming the tape library resides; (ii) the mount point or directory in the VTE wherein the tape library resides; (iii) the classification of the tape library as designated by the requesting entity; (iv) metadata associated with the tape library and/or the contents or data to which the tape library organizes; and (v) a configuration specifying the enablement or disablement of storage system features (e.g., deduplication, replication, encryption, compression, etc.) onto which data organized by the tape library would be stored. Moreover, the LMI for each tape library may be included within the new user specific configuration.

In Step 404, the VTS API provides the LBR (generated in Step 402) to a VTE. In one embodiment of the invention, identification or selection of which VTE to receive the LBR may be specified in the new user specific configuration, by way of a VTE ID. In another embodiment of the invention, identification or selection of which VTE to receive the LBR may be determined using load metrics observed across the set of VTEs forming the VTS. For example, the VTE with the least average load executing on its CPU and/or memory may be identified/selected as the VTE to which the LBR is provided. Identification or selection of which VTE to receive the LBR may be determined through alternative methodologies without departing from the scope of the invention.

In Step 406, after receiving the LBR, the VTE kernel (executing on the VTE identified/selected in Step 404) validates the LBR. In one embodiment of the invention, in validating the LBR, the VTE kernel may check each of the one or more tape library addition requests representing the LBR for errors. More specifically, the VTE kernel may inspect the LMI included in each tape library addition request for deficiencies. In one embodiment of the invention, a LMI deficiency may entail, for example, one or more of the following conclusions: (i) the storage location of tape volume images forming the tape library may be undefined or incorrect; (ii) the mount point for the tape library in the VTE may be undefined or incorrect; (iii) the classification of the tape library, designated by the requesting entity, may be unrecognizable; (iv) metadata describing the tape library and/or its contents may be undefined or incomplete; and (v) a configuration specifying a selection of storage system features to enable or disable may be incomplete or not provided.

In one embodiment of the invention, in validating the LBR, the VTE kernel may additionally or alternatively ascertain the availability of non-overlapping computing resources on the VTE and/or storage system. In such an embodiment, non-overlapping computing resources may refer to any remaining VTE and/or storage system resources such as, for example, CPU usage, memory consumption, and storage capacity, which have yet to be allocated to a mainframe user (i.e., unallocated computing resources). Further, in such an embodiment, a subset of the non-overlapping resources may be reserved for the implementation of tape libraries, while another subset of the non-overlapping resources may be reserved for the implementation of tape drives. As such, in validating the LBR, the VTE kernel may, more specifically, determine whether the available non-overlapping computing resources reserved for the implementation of tape libraries are sufficient to fulfill the set of tape library addition requests forming the LBR. In one embodiment of the invention, fulfillment of the set of tape library addition requests may entail the creation of a new set of tape libraries and a new set of tape library agents (TLAs) without placing a strain or otherwise affecting the performance of other computing resources allocated to one or more other mainframe users.

In Step 408, a determination is made as to whether deficiencies were detected in the set of LMI specified in the LBR and/or whether the available non-overlapping resources reserved for the implementation of tape libraries are enough to fulfill the LBR. If it is determined that no/zero deficiencies across all LMI were detected and/or the available non-overlapping computing resources reserved for tape libraries implementation are sufficient to fulfill the LBR without burdening the performance of other computing resources allocated to other mainframe users, then the process proceeds to Step 420 (see e.g., FIG. 4B). On the other hand, if it is determined that at least one deficiency in at least one LMI was detected and/or the available non-overlapping computing resources reserved for tape libraries implementation are insufficient to fulfill the LBR without burdening the performance of other computing resources allocated to other mainframe users, then the process proceeds to Step 480 (see e.g., FIG. 4E).

Figure 4B:
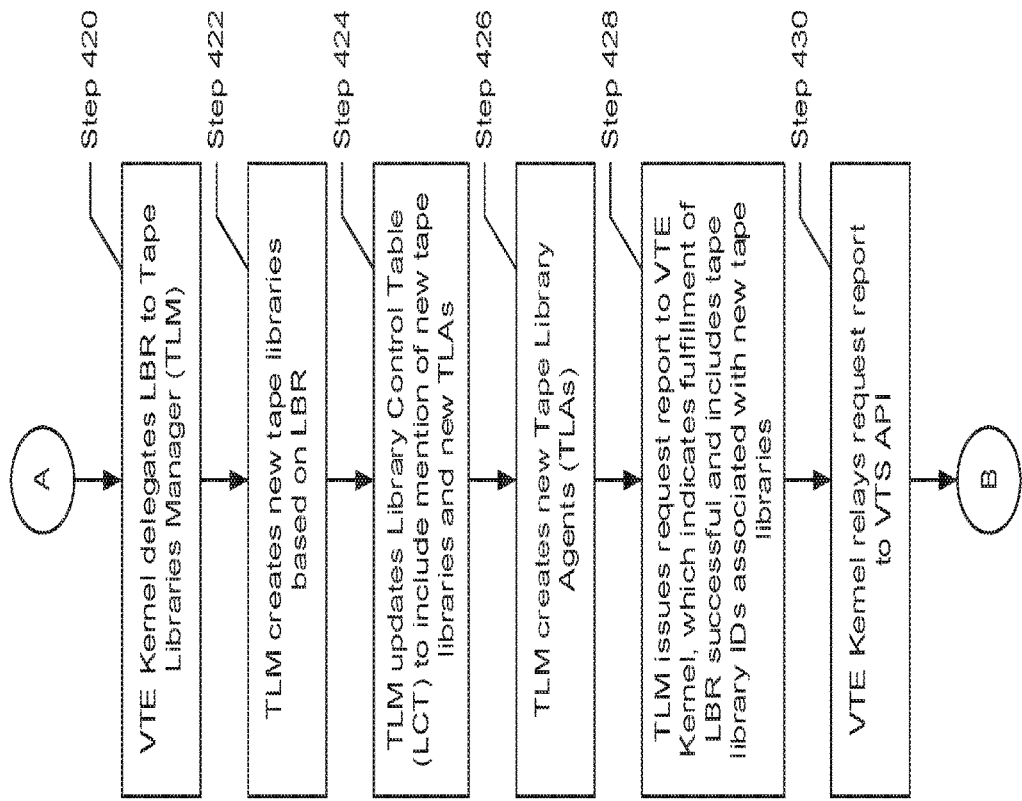

Turning to FIG. 4B, in Step 420, after determining (in Step 408) that all LMI contained zero deficiencies and/or sufficient non-overlapping computing resources are available, the VTE kernel delegates the LBR to the tape libraries manager (TLM). In one embodiment of the invention, prior to delegating the LBR, however, the VTE kernel may pause the execution of a library scanning process executing on the VTE. The library scanning process may be an instance of a computer program, which may include functionality to monitor the directory in which the various tape libraries (i.e., file systems) are defined. Specifically, the library scanning process monitors the aforementioned directory for changes such as, for example, the addition of new mount points represented by the introduction of new tape volume images (i.e., files or records) in the storage system. Prior to the invention disclosed herein, the detection of a new mount point by the executing library scanning process would trigger the attempted creation of a corresponding tape library without the availability of the necessary LMI, thereby leading to the incorrect configuration of the new mount point. Consequently, to circumvent this dilemma, embodiments of the invention call for the pausing of the library scanning process in order to fulfill the addition of tape libraries properly.

In Step 422, after the VTE kernel pauses the library scanning process, the TLM proceeds to create a set of one or more new tape libraries based on the one or more tape library addition requests forming the LBR. In one embodiment of the invention, the TLM may create the set of one or more tape libraries by processing each tape library addition request sequentially. The processing of each tape library addition request may entail the instantiation of a new tape library in accordance with the configuration information presented in the respective LMI included in the tape library addition request. As described above, a LMI may include information regarding the configuration of a tape library, which may include, but is not limited to: (i) the storage location in the storage system (see e.g., FIG. 1) wherein tape volume images forming the tape library resides; (ii) the mount point or directory in the VTE wherein the tape library resides; (iii) the classification of the tape library as designated by the requesting entity; (iv) metadata associated with the tape library and/or the contents or data to which the tape library organizes; and (v) a configuration specifying the enablement or disablement of storage system features (e.g., deduplication, replication, encryption, compression, etc.) onto which data organized by the tape library would be stored.

In Step 424, after creating each new tape library through the processing of each tape library addition request in the LBR, the TLM updates the library control table (LCT) (see e.g., FIG. 3B) and/or other data structures to include mention of the newly created tape libraries. In one embodiment of the invention, the TLM may further update at least the LCT to include mention of a set of one or more TLAs, which have yet to be created. These one or more TLAs would each include functionality to manage one of the newly created tape libraries. In one embodiment of the invention, updating the LCT may entail creating a new LCT entry in the LCT for each tape library and TLA pair. Further, each new LCT entry may at least contain a mapping relating one new tape library to one new TLA. More specifically, each new LCT entry may contain a new tape library ID associated with a new tape library and a new TLA ID associated with a yet to be created TLA.

In Step 426, after updating the LCT (in Step 424), the TLM creates the set of one or more new TLAs mentioned above. In one embodiment of the invention, creation of each new TLA may entail the instantiation of a new computer program instance, which is subsequently provided at least a portion of the LMI (i.e., the configuration information) respective to the new tape library that the new TLA will be managing. Further, in one embodiment of the invention, after creating the new TLAs, the TLM may resume the library scanning process executing on the VTE (and paused in Step 420).

In Step 428, the TLM issues a request report to the VTE kernel. In one embodiment of the invention, the request report may indicate that the addition of each new tape library, per the set of tape library addition requests, and subsequently, the fulfillment of the LBR, was successful. In one embodiment of the invention, the request report may further include the set of one or more new tape library IDs associated with the set of one or more newly created tape libraries. Moreover, in Step 430, upon receiving the request report, the VTE kernel relays the request report to the VTS API.

Figure 4C:
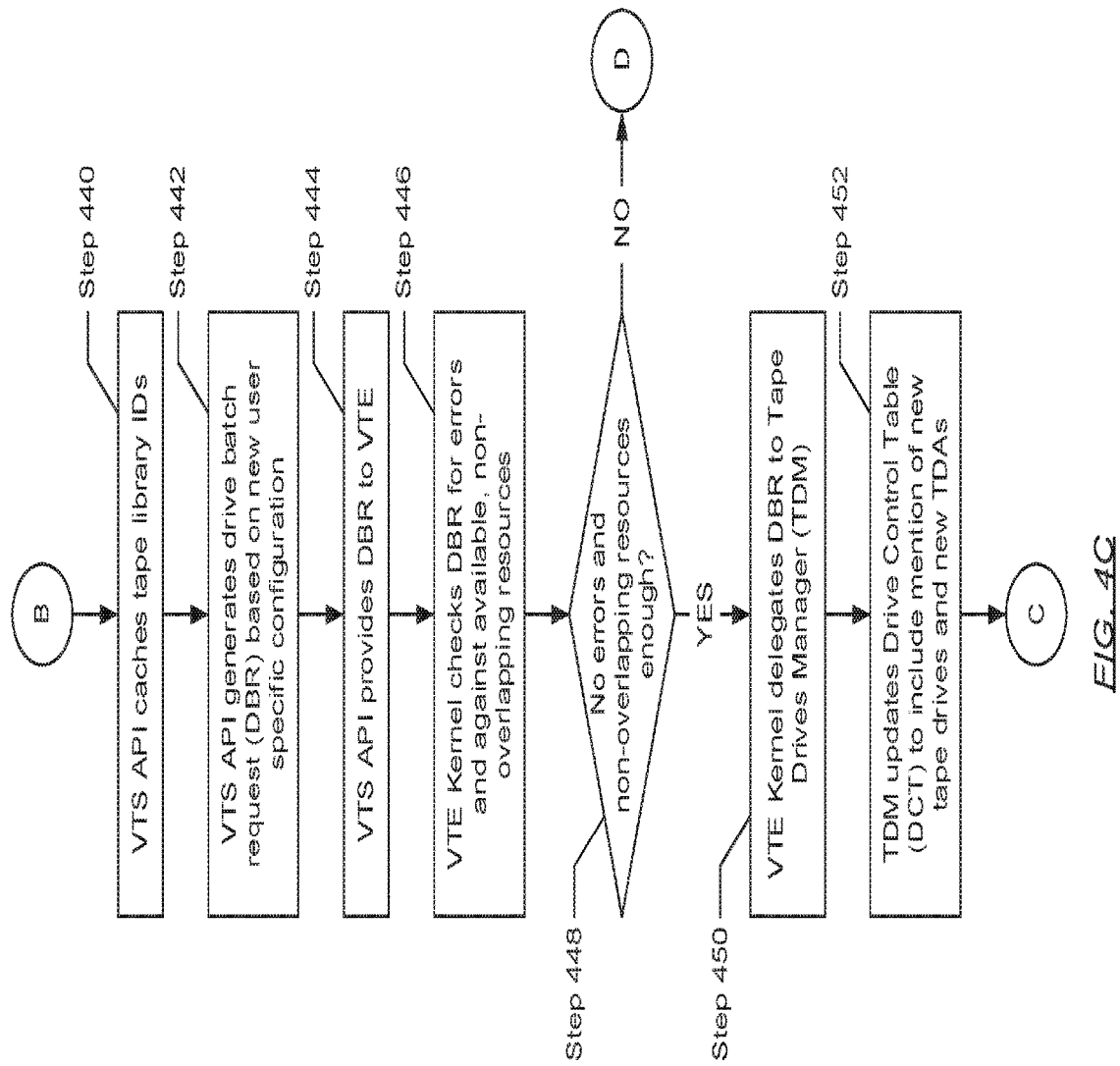

Turning to FIG. 4C, in Step 440, the VTS API receives the request report relayed by the VTE kernel (in Step 428). In one embodiment of the invention, the VTS API may subsequently extract the set of new tape library IDs included therein and cache the set of new tape library IDs in short-term memory. In Step 442, the VTS API proceeds to generate a drive batch request (DBR) based on the new user specific configuration (received by way of the new user request in Step 400). In one embodiment of the invention, the DBR may include a set or series of one or more tape drive addition requests. The number of tape drive addition requests expressed in the DBR equals the number of tape drives requested by the mainframe user by way of the new user specific configuration. For example, the new user specific configuration may request the allocation of 16 tape drives. Accordingly, a set of 16 tape drive addition requests may be generated to represent the DBR. Further, in one embodiment of the invention, each tape drive addition request may pertain to the configuration of a different tape drive, and thus, may include a different TDC specific to tape drive associated with the tape drive addition request. Each TDC may include, but is not limited to: (i) a tape library ID associated with a virtual tape library to which the virtual tape drive points (i.e., accesses); (ii) a media access control (MAC) address and/or Internet Protocol (IP) address assigned to the virtual tape drive; (iii) drive type information detailing the specifications for the physical tape drive model the virtual tape drive is to be emulating; and (iv) a set of parameters defining the behavior of the virtual tape drive.

In Step 444, the VTS API provides the DBR to the VTE (identified/selected in Step 404). In Step 446, after receiving the DBR from the VTS API, the VTE kernel executing on the VTE validates the DBR. In one embodiment of the invention, in validating the DBR, the VTE kernel may check each of the one or more tape drive addition requests representing the DBR for errors. More specifically, the VTE kernel may inspect the TDC included in each tape drive addition request for deficiencies. In one embodiment of the invention, a TDC deficiency may entail, for example, one or more of the following conclusions: (i) the tape library ID for a virtual tape library to which the virtual tape drive points may be undefined or incorrect; (ii) the MAC address and/or IP address assigned to the virtual tape drive may be undefined or incorrect; (iii) drive type information detailing the specifications for a physical tape drive model the virtual tape drive is to be emulating may be undefined or incomplete; and (iv) the set of parameters defining the behavior of the virtual tape drive may be undefined or incomplete.

In one embodiment of the invention, in validating the DBR, the VTE kernel may additionally or alternatively ascertain the availability of non-overlapping computing resources on the VTE and/or storage system. In such an embodiment, non-overlapping computing resources may refer to any remaining VTE and/or storage system resources such as, for example, CPU usage, memory consumption, and storage capacity, which have yet to be allocated to a mainframe user (i.e., unallocated computing resources). Further, in such an embodiment, a subset of the non-overlapping resources may be reserved for the implementation of tape libraries, while another subset of the non-overlapping resources may be reserved for the implementation of tape drives. As such, in validating the DBR, the VTE kernel may, more specifically, determine whether the available non-overlapping computing resources reserved for the implementation of tape drives are sufficient to fulfill the set of tape drive addition requests forming the DBR. In one embodiment of the invention, fulfillment of the set of tape drive addition requests may entail the creation of a new set of tape drives and a new set of tape drive agents (TDAs) without placing a strain or otherwise affecting the performance of other computing resources allocated to one or more other mainframe users.

In Step 448, a determination is made as to whether deficiencies were detected in the set of TDCs specified in the DBR and/or whether the available non-overlapping resources reserved for the implementation of tape drives are enough to fulfill the DBR. If it is determined that no/zero deficiencies across all TDCs were detected and/or the available non-overlapping computing resources reserved for tape drives implementation are sufficient to fulfill the DBR without burdening the performance of other computing resources allocated to other mainframe users, then the process proceeds to Step 450. On the other hand, if it is determined that at least one deficiency in at least one TDC was detected and/or the available non-overlapping computing resources reserved for tape drives implementation are insufficient to fulfill the DBR without burdening the performance of other computing resources allocated to other mainframe users, then the process proceeds to Step 480 (see e.g., FIG. 4E).

In Step 450, after determining (in Step 448) that all TDCs contained zero deficiencies and/or sufficient non-overlapping computing resources are available, the VTE kernel delegates the DBR to the tape drives manager (TDM). In Step 452, after obtaining the DBR, the TDM updates the drive control table (DCT) (see e.g., FIG. 3A) and/or other data structures to include mention of a yet to be created set of one or more new tape drives. In one embodiment of the invention, the TDM may further update the DCT to include mention of a yet to be created set of one or more new TDAs, wherein each new TDA would include functionality to manage one of the new yet to be created new tape drives. Further, updating the DCT may entail creating a new DCT entry in the DCT for each yet to be created new tape drive. Each new DCT entry may at least contain a mapping relating one new tape drive to a new TDA. More specifically, each new DCT entry may contain a new tape drive ID associated with a new tape drive and a new TDA ID associated with a corresponding new TDA.

Figure 4D:
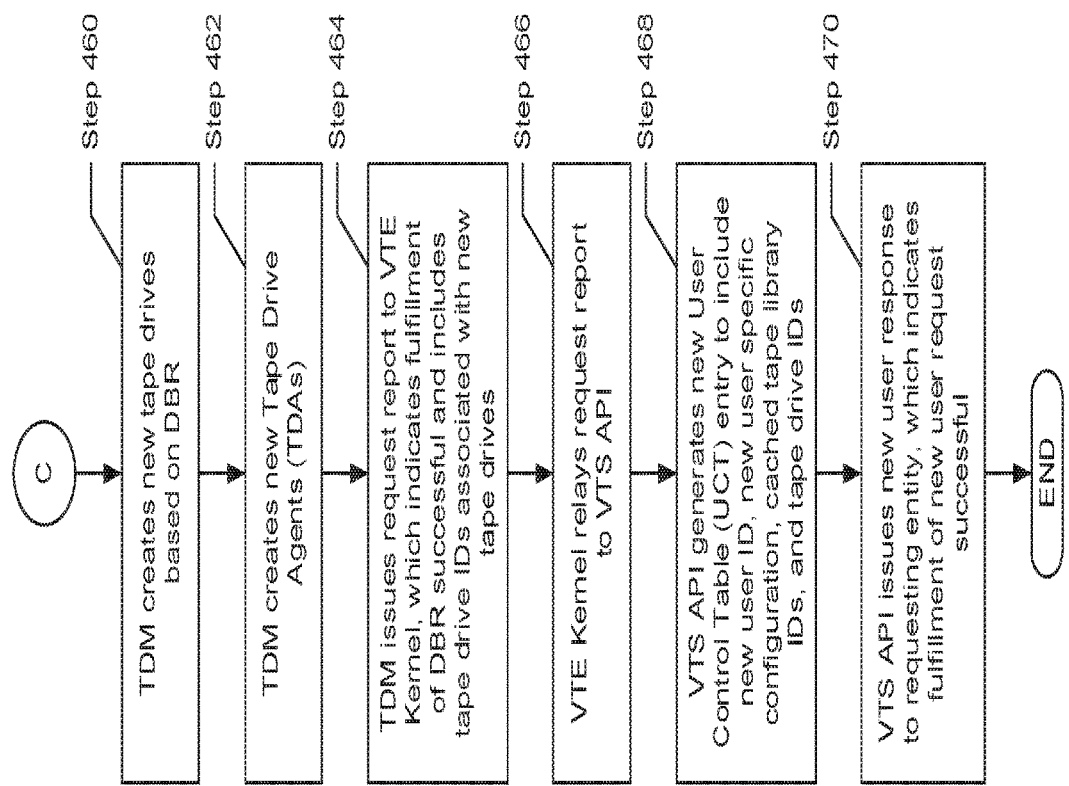

Turning to FIG. 4D, in Step 460, after updating the DCT (in Step 450), the TDM proceeds to create a set of one or more new tape drives based on the one or more tape drive addition requests forming the DBR. In one embodiment of the invention, the TDM may create the set of one or more tape drives by processing each tape drive addition request sequentially. The processing of each tape drive addition request may entail the instantiation (or emulation) of a new tape drive in accordance with the configuration information presented in the respective TDC included in the tape drive addition request.

In Step 462, after creating each new tape drive through the processing of each tape drive addition request in the DBR, the TDM creates the set of one or more new TDAs mentioned above. In one embodiment of the invention, creation of each new TDA may entail the instantiation of a new computer program instance, which is subsequently provided at least a portion of the TDC (i.e., the configuration information) respective to the new tape drive that the new TDA will be managing. In one embodiment of the invention, after creating each new TDA, the TDM establishes a set of connections between the mainframe and each newly created tape drive. Establishing the set of connections may entail, for example, the allocation of one or more fibre connection (FICON) ports on the VTE, which operatively connect the VTE to the mainframe, to each of the newly created tape drives.

In Step 464, the TDM issues a request report to the VTE kernel. In one embodiment of the invention, the request report may indicate that the addition of each new tape drive, per the set of tape drive addition requests, and subsequently, the fulfillment of the DBR, was successful. In one embodiment of the invention, the request report may further include the set of one or more new tape drive IDs associated with the set of one or more newly created tape drives. Moreover, in Step 466, upon receiving the request report, the VTE kernel relays the request report to the VTS API.

In Step 468, the VTS API receives the request report relayed by the VTE kernel (in Step 466). In one embodiment of the invention, the VTS API may subsequently extract the set of new tape drive IDs included therein. Further, in one embodiment of the invention, the VTS API may proceed in updating the user control table (UCT) (see e.g., FIG. 3C) to include mention of a new user per the new user request (received in Step 400). Updating the UCT may entail at least creating a new UCT entry in the UCT. The new UCT entry may at least contain a mapping relating the new mainframe user, the newly created tape drives, and the newly created tape libraries. More specifically, the new UCT entry may contain the new user ID and new user specific configuration (provided in the new user request) associated with the new mainframe user, the one or more new tape drive IDs associated with the newly created tape drives, and the one or more new tape library IDs associated with the newly created tape libraries. Finally, in Step 470, the VTS API issues a new user response, to the requesting entity, based on the request reports from the VTE kernel/TDM/TLM. In one embodiment of the invention, the new user response, like the request reports submitted by the TLM (in Step 428) and the TDM (in Step 464), may indicate that the fulfillment of the new user request was successful. From here, the process ends.

Figure 4E:
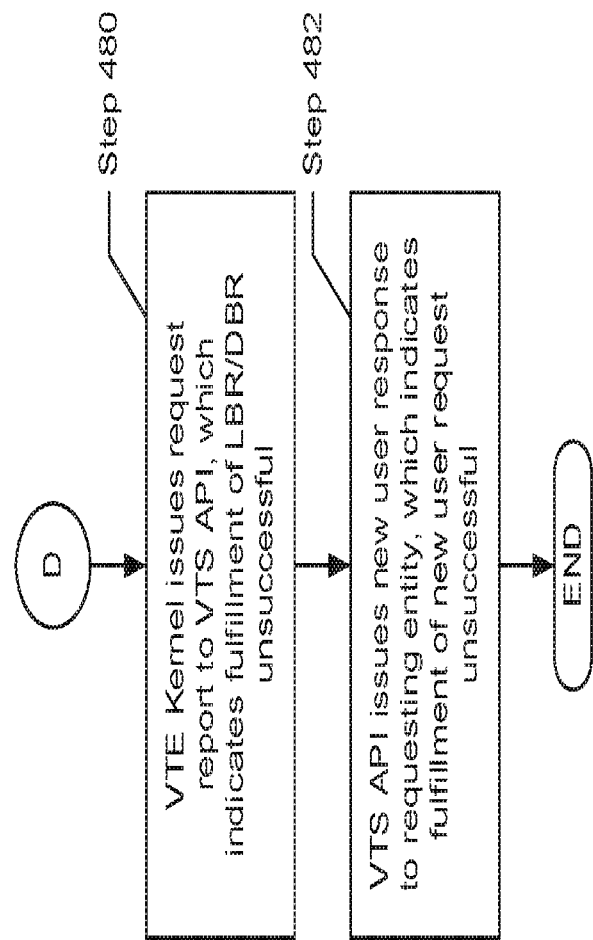

Turning to FIG. 4E, in Step 480, the VTE kernel issues a request report to the VTS API. In one embodiment of the invention, issuing of the request report may have resulted from the determination (in Step 408) that at least one deficiency in at least one LMI was detected and/or the available non-overlapping computing resources reserved for tape libraries implementation are insufficient to fulfill the LBR without burdening the performance of other computing resources allocated to other mainframe users. Alternatively, in another embodiment of the invention, issuing of the request report may have resulted from the determination (in Step 448) that at least one deficiency in at least one TDC was detected and/or the available non-overlapping computing resources reserved for tape drives implementation are insufficient to fulfill the DBR without burdening the performance of other computing resources allocated to other mainframe users. Furthermore, the request report may indicate that, because of any of the above-mentioned outcomes: (i) the addition of each new tape library, per the set of tape library addition requests, and subsequently, the fulfillment of the LBR was unsuccessful; or (ii) the addition of each new tape drive, per the set of tape drive addition requests, and subsequently, the fulfillment of the DBR was unsuccessful.

In Step 482, after receiving the request report from the VTE kernel, the VTS API issues a new user response to the requesting entity. In one embodiment of the invention, the new user response may be based on the received request report. Further, the new user response, like the request report, may indicate that the fulfillment of the new user request was unsuccessful because of errors and/or lack of sufficient computing resources to implement the LBR or DBR for configuring a new mainframe user. From here, the process ends.

FIGS. 5A-5I show flowcharts describing a method for modifying an existing user specific configuration non-disruptively in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel. In one embodiment of the invention, the steps shown in FIGS. 5A-5I may be performed in parallel with any other steps shown in FIGS. 4A-4E without departing from the scope of the invention.

Figure 5A:
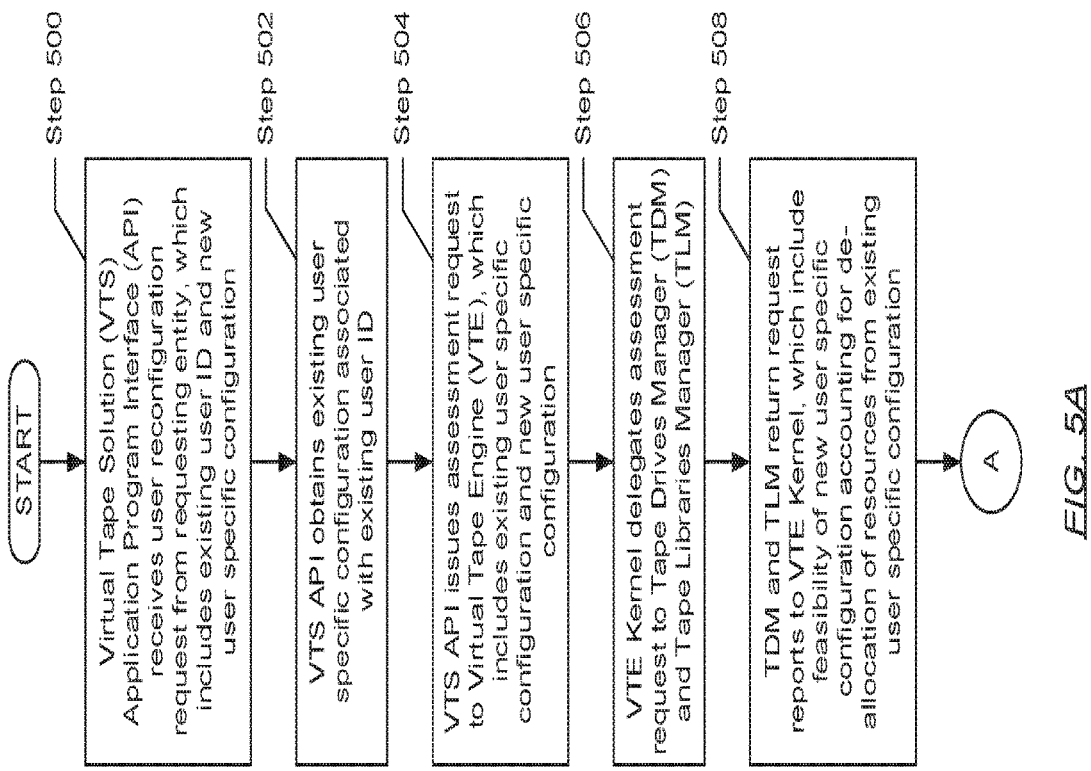

Turning to FIG. 5A, in Step 500, the virtual tape solution (VTS), or more specifically, the VTS application program interface (API) receives a user reconfiguration request from the requesting entity. In one embodiment of the invention, the user reconfiguration request may pertain to the re-allocation of virtual tape engine (VTE) computing resources to support the execution of processes (i.e., tasks) instantiated by an existing mainframe user. Subsequently, the user reconfiguration request may include an existing user ID associated with the existing mainframe user and a new user specific configuration (described above) specified by the existing mainframe user.

In Step 502, the VTS API obtains the existing user specific configuration associated with the existing user ID. In one embodiment of the invention, obtaining the existing user specific configuration may entail performing a lookup of the user control table (UCT) (see e.g., FIG. 3C) using the existing user ID. Specifically, a UCT entry may be identified, wherein the user ID specified in the UCT entry matches the existing user ID included in the user reconfiguration request. After identifying the appropriate UCT entry, the user specific configuration stored/specified in the UCT entry may be retrieved as the existing user specific configuration associated with the existing user ID.

In Step 504, the VTS API subsequently issues an assessment request to the virtual tape engine (VTE) on which the existing user specific configuration is implemented. In one embodiment of the invention, identification of the appropriate VTE may be determined by way of a VTE ID specified in the existing user specific configuration, or specified in the UCT entry (identified in Step 502). In another embodiment of the invention, the aforementioned VTE ID may also be specified in the new user specific configuration, or may be included as a separate item within the user reconfiguration request. Furthermore, in one embodiment of the invention, the assessment request may include the new user specific configuration (enclosed in the user reconfiguration request received in Step 500) and the existing user specific configuration (obtained from the UCT entry identified in Step 502). In one embodiment of the invention, the assessment request may inquire as to the feasibility of implementing the new user specific configuration on the VTE accounting for the currently available computing resources and the additional computing resources that may become available after deallocation of tape libraries and tape drives representative of the existing user specific configuration.

In Step 506, after receiving the assessment request from the VTS API, the VTE kernel delegates the assessment request to the tape drives manager (TDM) and the tape libraries manager (TLM). In one embodiment of the invention, the VTE kernel may delegate a portion of the assessment request pertaining to tape drives implementation specified in the new user specific configuration versus the existing user specific configuration to the TDM. Similarly, the VTE kernel may delegate another portion of the assessment request pertaining to tape libraries implementation specified in the new user specific configuration versus the existing user specific configuration to the TLM.

In Step 506, the TDM and TLM perform their respective assessments on the feasibility of new tape drives and new tape libraries implementation, respectively, specified by the new user specific configuration. In one embodiment of the invention, in performing its respective assessment, the TDM may compare the non-overlapping computing resources (discussed above) that may be expended by the implementation of one or more tape drives and/or corresponding tape drive agents (TDAs) specified in the new user specific configuration with the availability of non-overlapping computing resources remaining on the VTE as well as accounting for non-overlapping computing resources that may become available after deallocation of existing tape drives and/or existing TDAs representative of the existing user specific configuration. Performing the assessment may further entail determining whether the available, and/or soon to be available, non-overlapping computing resources reserved for tape drives implementation are sufficient to fulfill at least the tape drives portion of the new user specific configuration without burdening the performance of other computing resources allocated to other mainframe users.

In one embodiment of the invention, after completing its respective assessment, the TDM may generate and return a request report to the VTE kernel. The request report may outline the results of the assessment performed by the TDM. For example, in performing the assessment of the tape drives portion of the new user specific configuration, the TDM may conclude that implementation of its respective portion of the new user specific configuration is feasible because available and/or soon to be available non-overlapping computing resources reserved for tape drives implementation will be sufficient without burdening other mainframe users. Subsequently, the request report issued by the TDM may indicate a positive assessment. By way of another example, in performing the assessment of the tape drives portion of the new user specific configuration, the TDM may alternatively conclude that implementation of its respective portion of the new user specific configuration is not feasible because available and/or soon to be available non-overlapping computing resources reserved for tape drives implementation will not be enough, and will further burden other mainframe users. Subsequently, the request report issued by the TDM, in this case, may indicate a negative assessment.

Similarly, in one embodiment of the invention, in performing its respective assessment, the TLM may compare the non-overlapping computing resources (discussed above) that may be expended by the implementation of one or more tape libraries and/or corresponding tape library agents (TLAs) specified in the new user specific configuration with the availability of non-overlapping computing resources remaining on the VTE as well as accounting for non-overlapping computing resources that may become available after deallocation of existing tape libraries and/or existing TLAs representative of the existing user specific configuration. Performing the assessment may further entail determining whether the available, and/or soon to be available, non-overlapping computing resources reserved for tape libraries implementation are sufficient to fulfill at least the tape libraries portion of the new user specific configuration without burdening the performance of other computing resources allocated to other mainframe users.

In one embodiment of the invention, after completing its respective assessment, the TLM may generate and return a request report to the VTE kernel. The request report may outline the results of the assessment performed by the TLM. For example, in performing the assessment of the tape libraries portion of the new user specific configuration, the TLM may conclude that implementation of its respective portion of the new user specific configuration is feasible because available and/or soon to be available non-overlapping computing resources reserved for tape libraries implementation will be sufficient without burdening other mainframe users. Subsequently, the request report issued by the TLM may indicate a positive assessment. By way of another example, in performing the assessment of the tape libraries portion of the new user specific configuration, the TLM may alternatively conclude that implementation of its respective portion of the new user specific configuration is not feasible because available and/or soon to be available non-overlapping computing resources reserved for tape libraries implementation will not be enough, and will further burden other mainframe users. Subsequently, the request report issued by the TLM, in this case, may indicate a negative assessment.

Figure 5B:
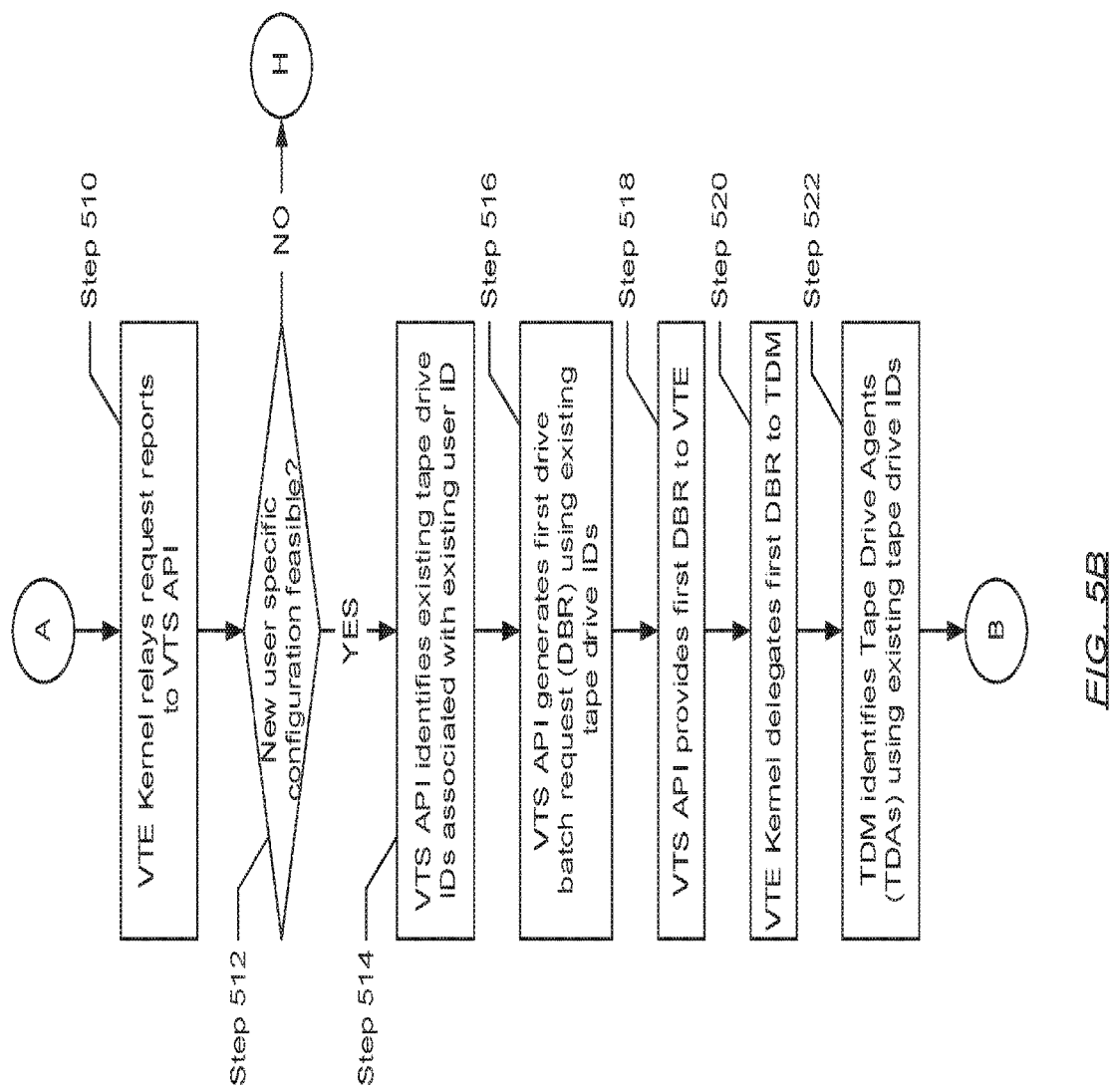

Turning to FIG. 5B, in Step 510, upon receiving the request reports from the TDM and the TLM (in Step 508), the VTE kernel relays the request reports to the VTS API. In Step 512, a determination is made, by the VTS API, as to whether implementation of the new user specific configuration on the VTE is feasible. If it is determined that the implementation of the new user specific configuration is feasible (i.e., the request reports issued by both the TDM and the TLM each indicate a positive assessment), then the process proceeds to Step 514. On the other hand, if it is determined that the implementation of the new user specific configuration is not feasible (i.e., at least one request report issued by either the TDM or the TLM indicates a negative assessment), then the process proceeds to Step 604 (see e.g., FIG. 5I).

In Step 514, after determining (in Step 512) that implementation of the new user specific configuration (enclosed with the user reconfiguration request received in Step 500) is feasible, the VTS API identifies any existing tape drive IDs associated with the existing user ID. In one embodiment of the invention, the set of one or more tape drive IDs also specified in the UCT entry (identified in Step 502) may be obtained, and thus, identified as the existing tape drive IDs associated with the existing user ID.

In Step 516, the VTS API then generates a first drive batch request (DBR) using the set of one or more tape drive IDs (obtained in Step 514). In one embodiment of the invention, the first DBR may include a set or series of one or more tape drive removal requests. The number of tape drive removal requests expressed in the first DBR may equal the number of tape drive IDs obtained earlier. For example, if 8 tape drive IDs were retrieved, then a set of 8 different tape drive removal requests may be generated to form the first DBR. Further, in one embodiment of the invention, each tape drive removal request may include one of the one or more earlier obtained tape drive IDs.

In Step 518, the VTS API subsequently provides the first DBR (generated in Step 516) to the VTE on which the existing user specific configuration is implemented. In Step 520, after receiving the first DBR from the VTS API, the VTE kernel executing on the aforementioned VTE delegates the first DBR to the TDM. Following this, through Steps 522 and 524-530 (see e.g., FIG. 5C), the TDM proceeds to remove the set of one or more existing tape drives based on the one or more tape drive removal requests forming the DBR. In one embodiment of the invention, the TDM may remove the set of one or more existing tape drives (i.e., specified by the existing user specific configuration) by processing each tape drive removal request sequentially. The processing thus entails: in Step 522, the identification of the one or more TDAs associated with the one or more existing tape drive IDs specified in the one or more tape drive removal requests of the DBR. In one embodiment of the invention, the TDM may identify each TDA by performing a lookup of the drive control table (DCT) (see e.g., FIG. 3A) using each existing tape drive ID. Specifically, the lookup may be performed to identify the TDA ID associated with the TDA responsible for managing one of the existing tape drives of the one or more existing tape drives that is to be removed.

Figure 5C:
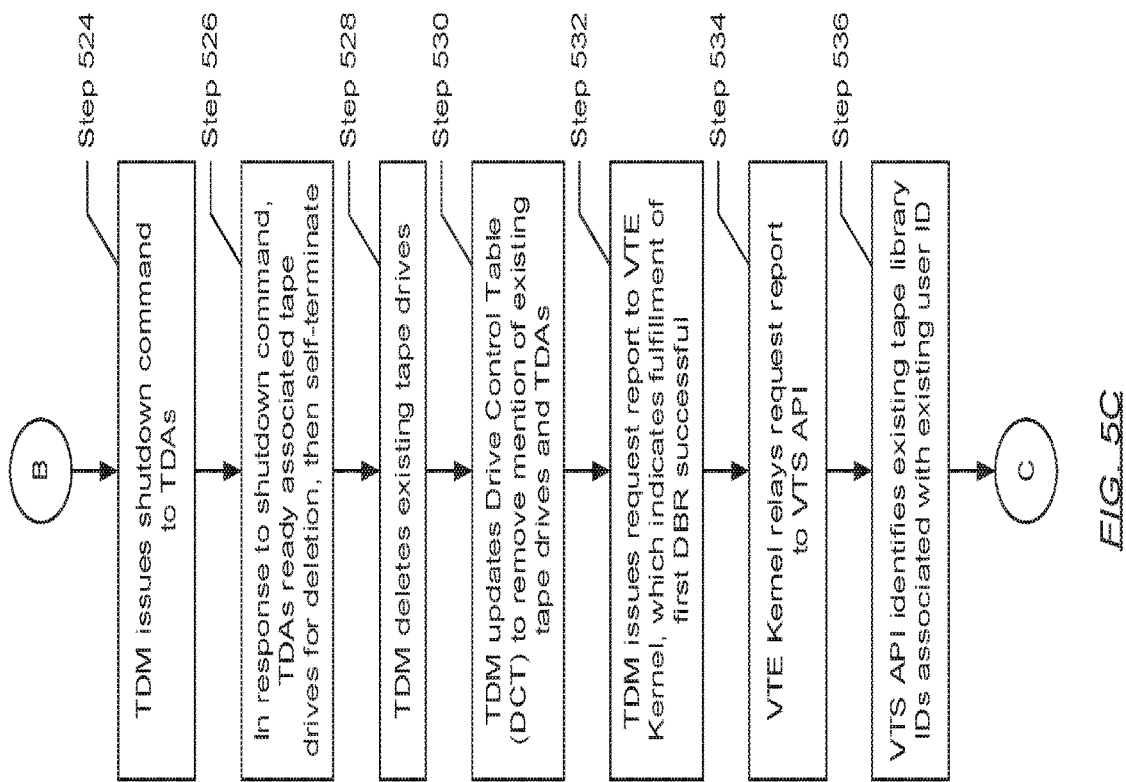

Turning to FIG. 5C, the processing of the tape drive removal requests by the TDM further entails: in Step 524, the issuing of a shutdown command to each TDA (identified in Step 522). In one embodiment of the invention, prior to issuing the shutdown command to each TDA, the TDM may be required to establish a connection with each of the identified TDAs. Each connection may be implemented using any existing inter-process communication mechanism including, but not limited to, the employment of a file transfer, a signal, a socket, a message queue, a pipe, shared memory, message passing, or the sharing of a memory-mapped file. Furthermore, in one embodiment of the invention, each shutdown command may include instructions mandating each TDA to ready the existing tape drive for which each TDA is responsible for removal.

In Step 528, the processing of the tape drive removal requests further entails: in response to receiving a shutdown command, each identified/existing TDA proceeds to block access to their respective existing tape drive. In one embodiment of the invention, blocking access to a tape drive may entail severing any existing connections between the tape drive and the mainframe. After successfully blocking access to their respective existing tape drive, each TDA readies their respective existing tape drive for removal. In one embodiment of the invention, readying an existing tape drive may entail cleaning up the existing tape drive, wherein cleaning up the existing tape drive may include, but is not limited to, the execution of the following processes: (i) the freeing up (or deallocation) of memory allocated to the existing tape drive; (ii) the refreshing of a tape library references counter; and (iii) the dumping of statistics related to the existing tape drive. Following the cleanup of their respective existing tape drive, each TDA may set a current usage state of their respective existing tape drive to a dead state, indicative that the respective tape drive is inactive and ready for deletion. Other current usage states that may describe a current status of a tape drive include, but are not limited to, an idle state where the tape drive is neither in-use (or being currently accessed) by at least one user operating the mainframe nor stalled, an in-use state where the tape drive is currently being accessed by at least one user of the mainframe, and a stalled state where the tape drive is non-responsive due to excess activity. In one embodiment of the invention, after readying their respective existing tape drive for deletion, each existing TDA subsequently self-terminates.

In Step 528, the processing of the tape drive removal requests further entails: based on the dead state of each existing tape drive (partially representative of the existing user specific configuration), the TDM deletes the set of one or more existing tape drives from the VTE. Moreover, in Step 530, the TDM then updates the DCT (see e.g., FIG. 3A) and/or other data structures to remove mention of the recently deleted tape drives and the self-terminated TDAs. In one embodiment of the invention, removing mention of each TDA-tape drive pair may at least entail deleting the existing DCT entry in the DCT in which a mapping between the TDA ID associated with one TDA and the tape drive ID associated with a corresponding one tape drive is stored.

In Step 532, after removing mention of each TDA-tape drive pair (in Step 530), the TDM issues a request report to the VTE kernel. In one embodiment of the invention, the request report may indicate that the removal of each existing tape drive (per the processing of the one or more tape drive removal requests of the first DBR) was successful. In Step 534, upon receiving the request report (issued by the TDM in Step 530), the VTE kernel relays the request report to the VTS API.

In Step 536, after receiving the successful request report from the VTE kernel pertaining to the removal of the one or more tape drives respective to the existing user specific configuration, the VTS API identifies any existing tape library IDs associated with the existing user ID. In one embodiment of the invention, the set of one or more tape library IDs also specified in the UCT entry (identified in Step 502) may be obtained, and thus, identified as the existing tape library IDs associated with the existing user ID.

Figure 5D:
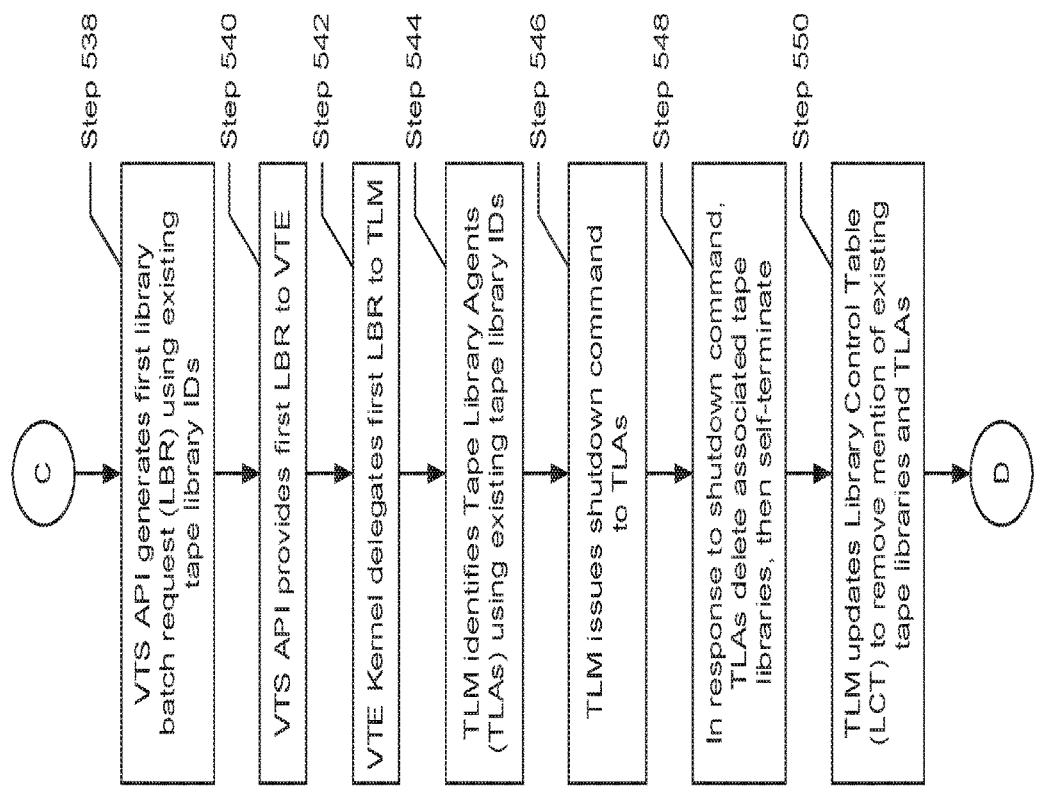

Turning to FIG. 5D, in Step 538, the VTS API then generates a first library batch request (LBR) using the set of one or more tape library IDs (obtained in Step 536). In one embodiment of the invention, the first LBR may include a set or series of one or more tape library removal requests. The number of tape library removal requests expressed in the first LBR may equal the number of tape library IDs obtained earlier. For example, if 8 tape library IDs were retrieved, then a set of 8 different tape library removal requests may be generated to form the first LBR. Further, in one embodiment of the invention, each tape library removal request may include one of the one or more earlier obtained tape library IDs.

In Step 540, the VTS API subsequently provides the first LBR (generated in Step 538) to the VTE on which the existing user specific configuration is implemented. In Step 542, after receiving the first LBR from the VTS API, the VTE kernel executing on the aforementioned VTE delegates the first LBR to the TLM. Following this, through Steps 544-550, the TLM proceeds to remove the set of one or more existing tape libraries based on the one or more tape library removal requests forming the LBR. In one embodiment of the invention, the TLM may remove the set of one or more existing tape libraries (i.e., specified by the existing user specific configuration) by processing each tape library removal request sequentially. The processing thus entails: in Step 544, the identification of the one or more TLAs associated with the one or more existing tape library IDs specified in the one or more tape library removal requests of the LBR. In one embodiment of the invention, the TLM may identify each TLA by performing a lookup of the library control table (LCT) (see e.g., FIG. 3B) using each existing tape library ID. Specifically, the lookup may be performed to identify the TLA ID associated with the TLA responsible for managing one of the existing tape libraries of the one or more existing tape libraries that is to be removed.

In Step 546, the processing of the tape library removal requests by the TLM further entails: the issuing of a shutdown command to each TLA (identified in Step 544). In one embodiment of the invention, prior to issuing the shutdown command to each TLA, the TLM may be required to establish a connection with each of the identified TLAs. Each connection may be implemented using any existing inter-process communication mechanism including, but not limited to, the employment of a file transfer, a signal, a socket, a message queue, a pipe, shared memory, message passing, or the sharing of a memory-mapped file. Furthermore, in one embodiment of the invention, each shutdown command may include instructions mandating each TLA to delete the existing tape library for which each TLA is responsible.

In Step 548, the processing of the tape library removal requests further entails: in response to receiving a shutdown command, each identified/existing TLA proceeds delete/ remove their respective existing tape library for which the TLA is responsible. In one embodiment of the invention, after deleting their respective existing tape library, each existing TLA subsequently self-terminates.

In Step 550, the processing of the tape library removal requests further entails: the updating of the library control table (LCT) (see e.g., FIG. 3B) and/or other data structures, by the TLM, to remove mention of the recently deleted tape libraries and the self-terminated TLAs. In one embodiment of the invention, removing mention of each TLA-tape library pair may at least entail deleting the existing LCT entry in the LCT in which a mapping between the TLA ID associated with one TLA and the tape library ID associated with a corresponding one tape library is stored.

Figure 5E:
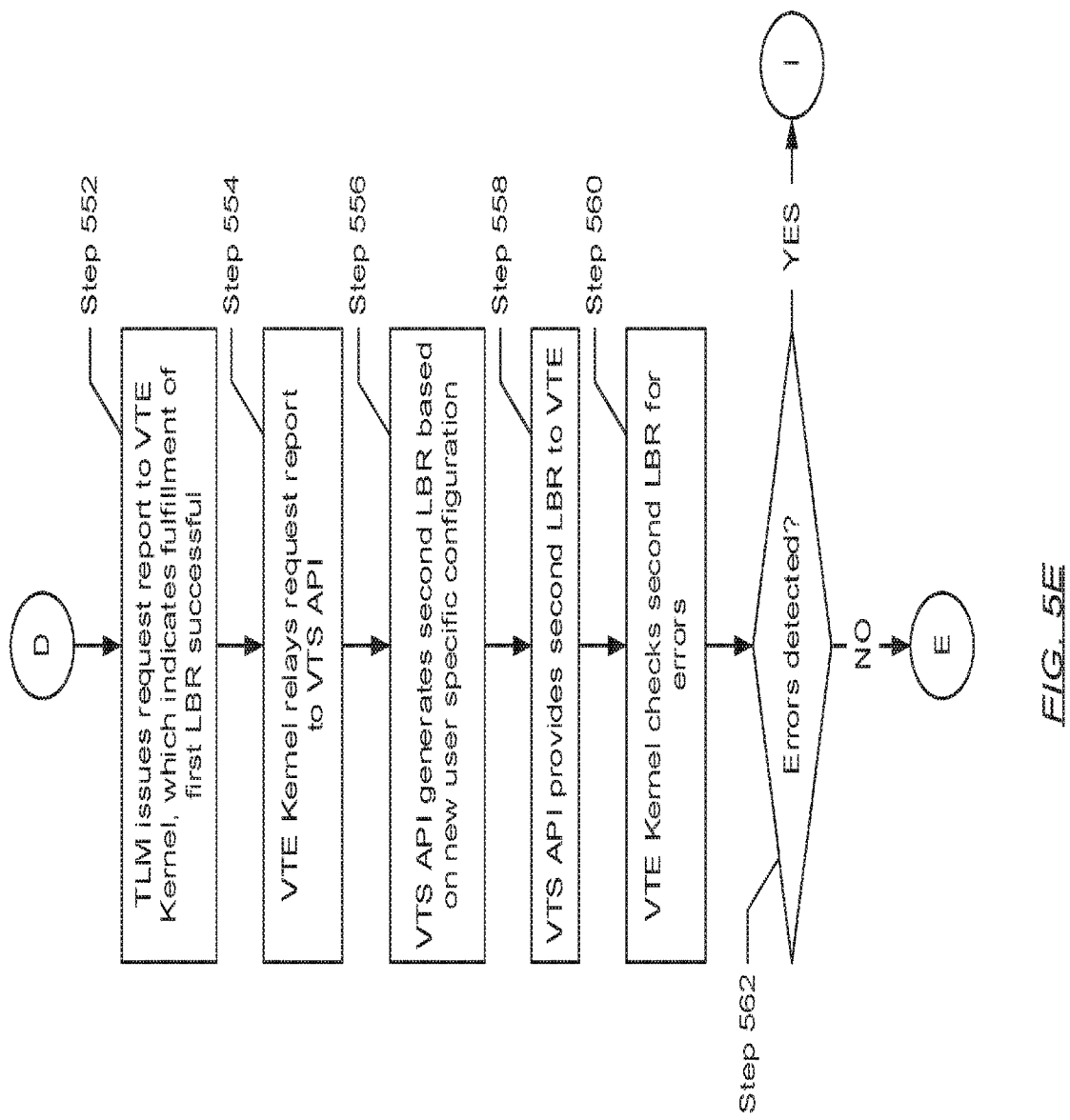
Figure 5E:
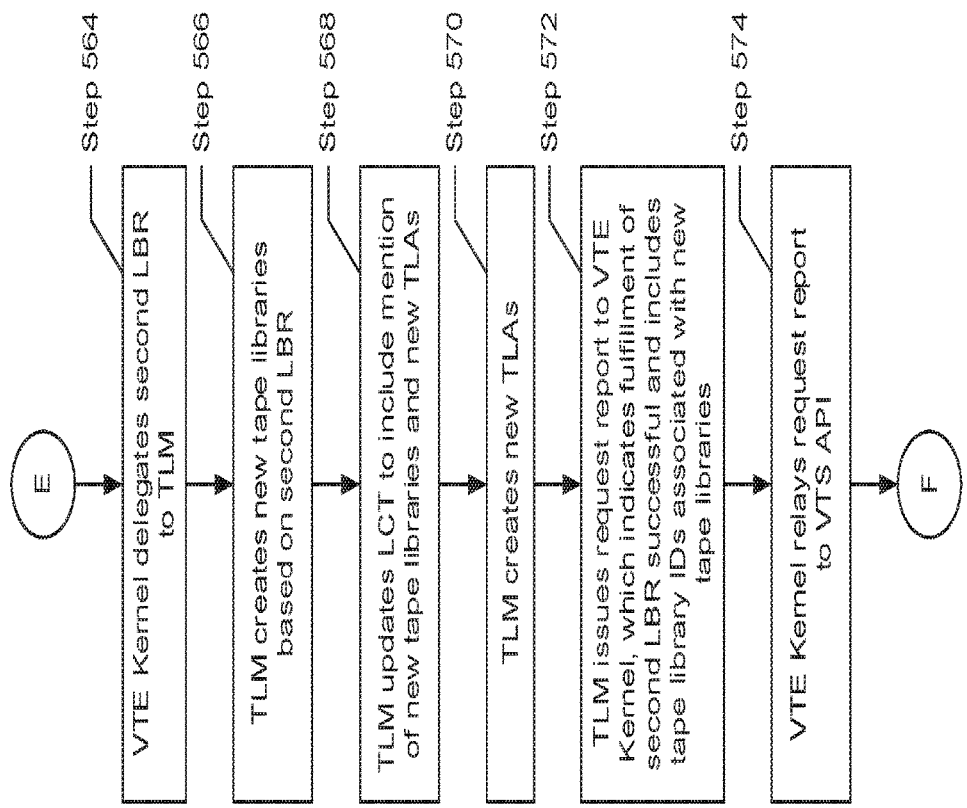

Turning to FIG. 5E, in Step 552, after removing mention of each TLA-tape library pair (in Step 550), the TLM issues a request report to the VTE kernel. In one embodiment of the invention, the request report may indicate that the removal of each existing tape library (per the processing of the one or more tape library removal requests of the first LBR) was successful. In Step 554, upon receiving the request report (issued by the TLM in Step 552), the VTE kernel relays the request report to the VTS API.

In Step 556, after receiving the successful request report from the VTE kernel pertaining to the removal of the one or more tape libraries respective to the existing user specific configuration, the VTS API generates a second LBR based on the new user specific configuration. In one embodiment of the invention, the second LBR may include a set or series of one or more tape library addition requests. The number of tape library addition requests expressed in the second LBR equals the number of tape libraries requested by the mainframe user by way of the new user specific configuration. For example, the new user specific configuration may request the allocation of 16 tape libraries. Accordingly, a set of 16 tape library addition requests may be generated to represent the second LBR. Further, in one embodiment of the invention, each tape library addition request may pertain to the configuration of a different tape library, and thus, may include different library management information (LMI) specific to the tape library associated with the tape library addition request. Each LMI may include information pertaining to, but not limited to: (i) the storage location in the storage system (see e.g., FIG. 1) wherein tape volume images forming the tape library resides; (ii) the mount point or directory in the VTE wherein the tape library resides; (iii) the classification of the tape library as designated by the requesting entity; (iv) metadata associated with the tape library and/or the contents or data to which the tape library organizes; and (v) a configuration specifying the enablement or disablement of storage system features (e.g., deduplication, replication, encryption, compression, etc.) onto which data organized by the tape library would be stored. Moreover, the LMI for each tape library may be provided by way of the new user specific configuration.

In Step 558, the VTS API provides the second LBR (generated in Step 556) to the VTE on which the existing user specific configuration had been implemented. In Step 560, after receiving the second LBR, the VTE kernel (executing on the aforementioned VTE) validates the second LBR. In one embodiment of the invention, in validating the second LBR, the VTE kernel may check each of the one or more tape library addition requests representing the second LBR for errors. More specifically, the VTE kernel may inspect the LMI included in each tape library addition request for deficiencies. In one embodiment of the invention, a LMI deficiency may entail, for example, one or more of the following conclusions: (i) the storage location of tape volume images forming the tape library may be undefined or incorrect; (ii) the mount point for the tape library in the VTE may be undefined or incorrect; (iii) the classification of the tape library, designated by the requesting entity, may be unrecognizable; (iv) metadata describing the tape library and/or its contents may be undefined or incomplete; and (v) a configuration specifying a selection of storage system features to enable or disable may be incomplete or not provided.

In Step 562, a determination is made as to whether deficiencies were detected in the set of LMI specified in the second LBR. If it is determined that no/zero deficiencies across all LMI were detected, then the process proceeds to Step 564 (see e.g., FIG. 5F). On the other hand, if it is determined that at least one deficiency in at least one LMI was detected, then the process proceeds to Step 602 (see e.g., FIG. 5I).

Turning to FIG. 5F, in Step 564, after determining (in Step 562) that all LMI contained zero deficiencies, the VTE kernel delegates the second LBR to the TLM. In one embodiment of the invention, prior to delegating the second LBR, however, the VTE kernel may pause the execution of a library scanning process executing on the VTE. The library scanning process may be an instance of a computer program, which may include functionality to monitor the directory in which the various tape libraries (i.e., file systems) are defined. Specifically, the library scanning process monitors the aforementioned directory for changes such as, for example, the addition of new mount points represented by the introduction of new tape volume images (i.e., files or records) in the storage system. Prior to the invention disclosed herein, the detection of a new mount point by the executing library scanning process would trigger the attempted creation of a corresponding tape library without the availability of the necessary LMI, thereby leading to the incorrect configuration of the new mount point. Consequently, to circumvent this dilemma, embodiments of the invention call for the pausing of the library scanning process in order to fulfill the addition of tape libraries properly.

In Step 566, after the VTE kernel pauses the library scanning process, the TLM proceeds to create a set of one or more new tape libraries based on the one or more tape library addition requests forming the second LBR. In one embodiment of the invention, the TLM may create the set of one or more tape libraries by processing each tape library addition request sequentially. The processing of each tape library addition request may entail the instantiation of a new tape library in accordance with the configuration information presented in the respective LMI included in the tape library addition request. As described above, a LMI may include information regarding the configuration of a tape library, which may include, but is not limited to: (i) the storage location in the storage system (see e.g., FIG. 1) wherein tape volume images forming the tape library resides; (ii) the mount point or directory in the VTE wherein the tape library resides; (iii) the classification of the tape library as designated by the requesting entity; (iv) metadata associated with the tape library and/or the contents or data to which the tape library organizes; and (v) a configuration specifying the enablement or disablement of storage system features (e.g., deduplication, replication, encryption, compression, etc.) onto which data organized by the tape library would be stored.

In Step 568, after creating each new tape library through the processing of each tape library addition request in the second LBR, the TLM updates the LCT (see e.g., FIG. 3B)

and/or other data structures to include mention of the newly created tape libraries. In one embodiment of the invention, the TLM may further update at least the LCT to include mention of a set of one or more TLAs, which have yet to be created. These one or more TLAs would each include functionality to manage one of the newly created tape libraries. In one embodiment of the invention, updating the LCT may entail creating a new LCT entry in the LCT for each tape library and TLA pair. Further, each new LCT entry may at least contain a mapping relating one new tape library to one new TLA. More specifically, each new LCT entry may contain a new tape library ID associated with a new tape library and a new TLA ID associated with a yet to be created TLA.

In Step 570, after updating the LCT (in Step 568), the TLM creates the set of one or more new TLAs mentioned above. In one embodiment of the invention, creation of each new TLA may entail the instantiation of a new computer program instance, which is subsequently provided at least a portion of the LMI (i.e., the configuration information) respective to the new tape library that the new TLA will be managing. Further, in one embodiment of the invention, after creating the new TLAs, the TLM may resume the library scanning process executing on the VTE (and paused in Step 564).

In Step 572, the TLM issues a request report to the VTE kernel. In one embodiment of the invention, the request report may indicate that the addition of each new tape library, per the set of tape library addition requests, and subsequently, the fulfillment of the second LBR, was successful. In one embodiment of the invention, the request report may further include the set of one or more new tape library IDs associated with the set of one or more newly created tape libraries. Moreover, in Step 574, upon receiving the request report, the VTE kernel relays the request report to the VTS API.

Figure 5G:
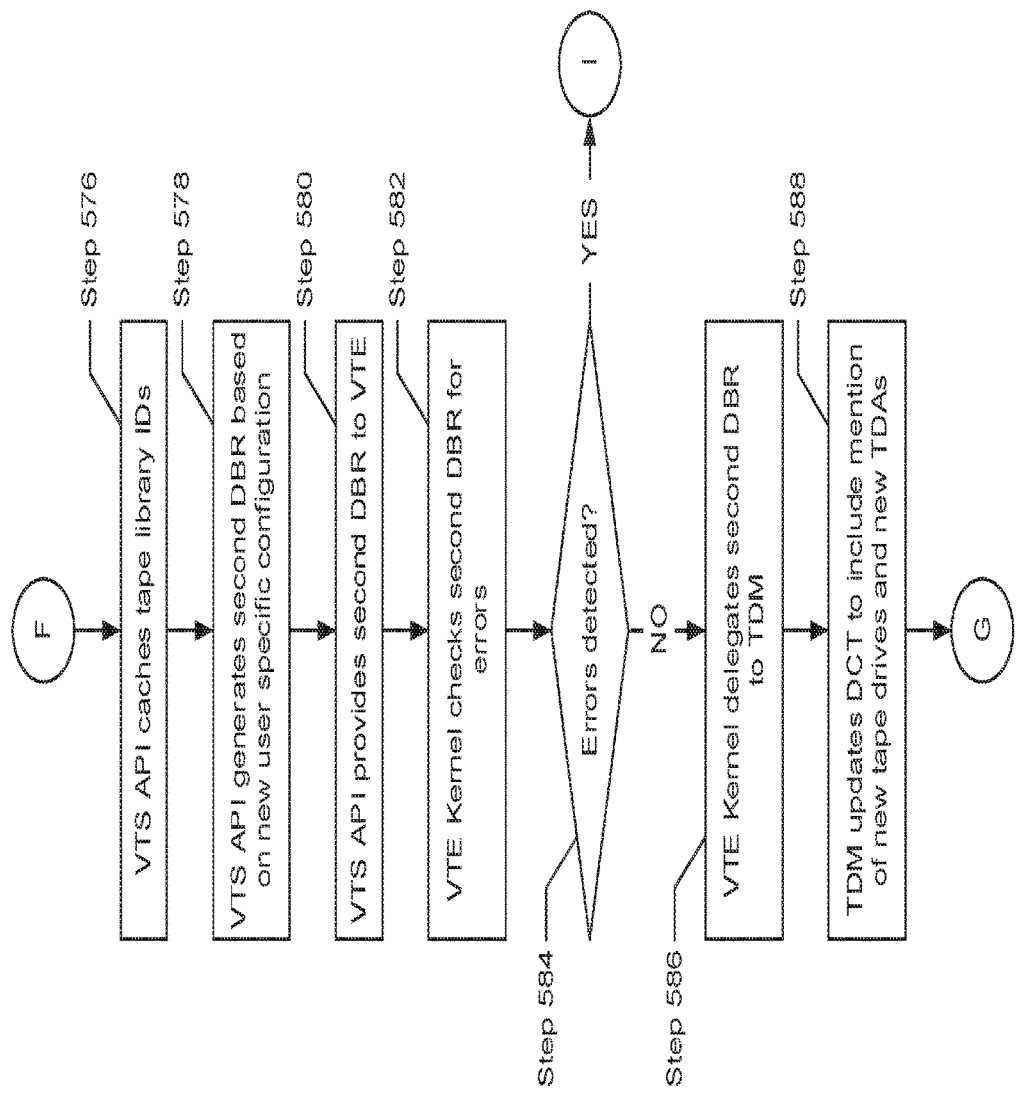

Turning to FIG. 5G, in Step 576, the VTS API receives the request report relayed by the VTE kernel (in Step 574). In one embodiment of the invention, the VTS API may subsequently extract the set of new tape library IDs included therein and cache the set of new tape library IDs in short-term memory. In Step 578, the VTS API proceeds to generate a second DBR based on the new user specific configuration (received by way of the user reconfiguration request in Step 500). In one embodiment of the invention, the second DBR may include a set or series of one or more tape drive addition requests. The number of tape drive addition requests expressed in the second DBR equals the number of tape drives requested by the mainframe user by way of the new user specific configuration. For example, the new user specific configuration may request the allocation of 16 tape drives. Accordingly, a set of 16 tape drive addition requests may be generated to represent the second DBR. Further, in one embodiment of the invention, each tape drive addition request may pertain to the configuration of a different tape drive, and thus, may include a different TDC specific to tape drive associated with the tape drive addition request. Each TDC may include, but is not limited to: (i) a tape library ID associated with a virtual tape library to which the virtual tape drive points (i.e., accesses); (ii) a media access control (MAC) address and/or Internet Protocol (IP) address assigned to the virtual tape drive; (iii) drive type information detailing the specifications for the physical tape drive model the virtual tape drive is to be emulating; and (iv) a set of parameters defining the behavior of the virtual tape drive.

In Step 580, the VTS API provides the second DBR to the VTE (whereon the existing user specific configuration had been implemented). In Step 582, after receiving the second DBR from the VTS API, the VTE kernel executing on the VTE validates the second DBR. In one embodiment of the invention, in validating the second DBR, the VTE kernel may check each of the one or more tape drive addition requests representing the second DBR for errors. More specifically, the VTE kernel may inspect the TDC included in each tape drive addition request for deficiencies. In one embodiment of the invention, a TDC deficiency may entail, for example, one or more of the following conclusions: (i) the tape library ID for a virtual tape library to which the virtual tape drive points may be undefined or incorrect; (ii) the MAC address and/or IP address assigned to the virtual tape drive may be undefined or incorrect; (iii) drive type information detailing the specifications for a physical tape drive model the virtual tape drive is to be emulating may be undefined or incomplete; and (iv) the set of parameters defining the behavior of the virtual tape drive may be undefined or incomplete.

In Step 584, a determination is made as to whether deficiencies were detected in the set of TDCs specified in the second DBR. If it is determined that no/zero deficiencies across all TDCs were detected, then the process proceeds to Step 586. On the other hand, if it is determined that at least one deficiency in at least one TDC was detected, then the process proceeds to Step 602 (see e.g., FIG. 5I).

In Step 586, after determining (in Step 584) that all TDCs contained zero deficiencies, the VTE kernel delegates the second DBR to the TDM. In Step 588, after obtaining the second DBR, the TDM updates the DCT (see e.g., FIG. 3A) and/or other data structures to include mention of a yet to be created set of one or more new tape drives. In one embodiment of the invention, the TDM may further update the DCT to include mention of a yet to be created set of one or more new TDAs, wherein each new TDA would include functionality to manage one of the new yet to be created new tape drives. Further, updating the DCT may entail creating a new DCT entry in the DCT for each yet to be created new tape drive. Each new DCT entry may at least contain a mapping relating one new tape drive to a new TDA. More specifically, each new DCT entry may contain a new tape drive ID associated with a new tape drive and a new TDA ID associated with a corresponding new TDA.

Figure 5H:
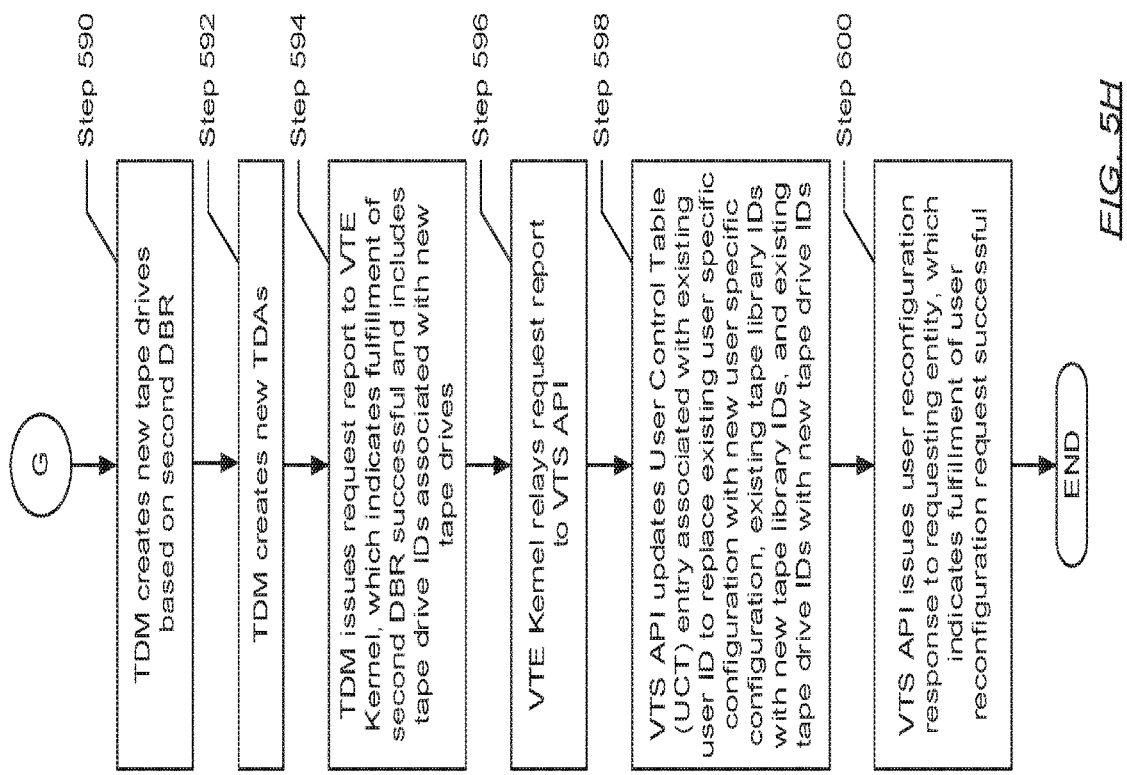

Turning to FIG. 5H, in Step 590, after updating the DCT (in Step 588), the TDM proceeds to create a set of one or more new tape drives based on the one or more tape drive addition requests forming the second DBR. In one embodiment of the invention, the TDM may create the set of one or more tape drives by processing each tape drive addition request sequentially. The processing of each tape drive addition request may entail the instantiation (or emulation) of a new tape drive in accordance with the configuration information presented in the respective TDC included in the tape drive addition request.

In Step 592, after creating each new tape drive through the processing of each tape drive addition request in the second DBR, the TDM creates the set of one or more new TDAs mentioned above. In one embodiment of the invention, creation of each new TDA may entail the instantiation of a new computer program instance, which is subsequently provided at least a portion of the TDC (i.e., the configuration information) respective to the new tape drive that the new TDA will be managing. In one embodiment of the invention, after creating each new TDA, the TDM establishes a set of connections between the mainframe and each newly created tape drive. Establishing the set of connections may entail, for example, the allocation of one or more fibre connection (FICON) ports on the VTE, which operatively connect the VTE to the mainframe, to each of the newly created tape drives.

In Step 594, the TDM issues a request report to the VTE kernel. In one embodiment of the invention, the request report may indicate that the addition of each new tape drive, per the set of tape drive addition requests, and subsequently, the fulfillment of the second DBR, was successful. In one embodiment of the invention, the request report may further include the set of one or more new tape drive IDs associated with the set of one or more newly created tape drives. Moreover, in Step 596, upon receiving the request report, the VTE kernel relays the request report to the VTS API.

In Step 598, the VTS API receives the request report relayed by the VTE kernel (in Step 596). In one embodiment of the invention, the VTS API may subsequently extract the set of new tape drive IDs included therein. Further, in one embodiment of the invention, the VTS API may proceed in updating the user control table (UCT) (see e.g., FIG. 3C) to modify the UCT entry (identified in Step 502) associated with the existing user ID. More specifically, updating the aforementioned UCT entry associated with the existing user ID may entail replacing the existing user specific configuration specified in the UCT entry with the new user specific configuration (received in Step 500). Updating the aforementioned UCT entry may further entail replacing the existing tape drive IDs specified in the UCT entry with the new tape drive IDs (extracted from the TDM issued request report in Step 598). Moreover, updating the aforementioned UCT entry may further yet entail replacing the existing tape library IDs specified in the UCT entry with the new tape library IDs (extracted from the TLM issued request report in Step 576).

Finally, in Step 600, the VTS API issues a user reconfiguration response, to the requesting entity, based on the request reports from the VTE kernel/TDM/TLM. In one embodiment of the invention, the user reconfiguration response, like the request reports submitted by the TLM (in Step 572) and the TDM (in Step 594), may indicate that the fulfillment of the user reconfiguration request was successful. From here, the process ends.

Figure 5I:
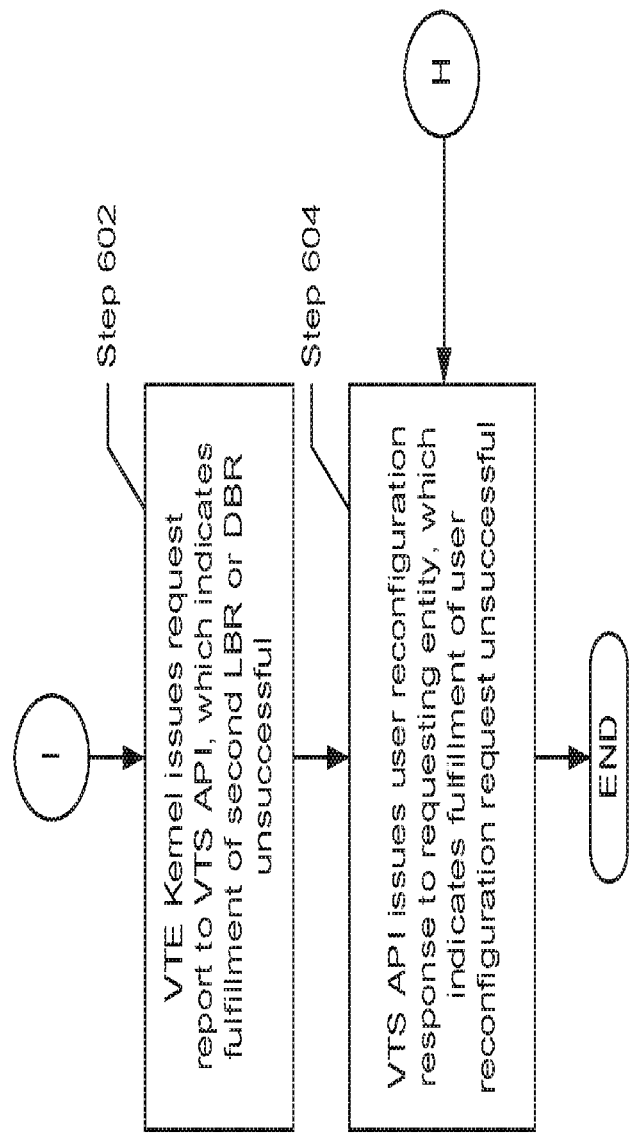

Turning to FIG. 5I, in Step 602, the VTE kernel issues a request report to the VTS API. In one embodiment of the invention, issuing of the request report may have resulted from the determination (in Step 562) that at least one deficiency in at least one LMI was detected. Alternatively, in another embodiment of the invention, issuing of the request report may have resulted from the determination (in Step 584) that at least one deficiency in at least one TDC was detected. Furthermore, the request report may indicate that, because of any of the above-mentioned outcomes: (i) the addition of each new tape library, per the set of tape library addition requests, and subsequently, the fulfillment of the second LBR was unsuccessful; or (ii) the addition of each new tape drive, per the set of tape drive addition requests, and subsequently, the fulfillment of the second DBR was unsuccessful.

In Step 604, in one embodiment of the invention, after receiving the request report from the VTE kernel (in Step 602), the VTS API issues a user reconfiguration response to the requesting entity. The user reconfiguration response, in such an embodiment, and like the aforementioned request report, may indicate that the fulfillment of the user reconfiguration request was unsuccessful because of errors detected in the set of LMI and/or the set of TDCs provided by way of the new user specific configuration. In another embodiment of the invention, the VTS AP may issue a user reconfiguration response as a result of the determination (in Step 512) that implementation of the new user specific configuration is not feasible. As discussed above, implementation of the new user specific configuration may not be feasible when: (i) in performing the assessment of the tape drives portion of the new user specific configuration, the TDM may conclude that implementation of its respective portion of the new user specific configuration is not feasible because available and/or soon to be available non-overlapping computing resources reserved for tape drives implementation will not be enough, and will further burden other mainframe users; or (ii) in performing the assessment of the tape libraries portion of the new user specific configuration, the TLM may conclude that implementation of its respective portion of the new user specific configuration is not feasible because available and/or soon to be available non-overlapping computing resources reserved for tape libraries implementation will not be enough, and will further burden other mainframe users. Subsequently, in such an embodiment, the user reconfiguration response may indicate that the fulfillment of the user reconfiguration request was unsuccessful because of at least one negative assessment, regarding the feasibility of implementing the new user specific configuration, issued by either the TLM or the TDM.

Figure 6:
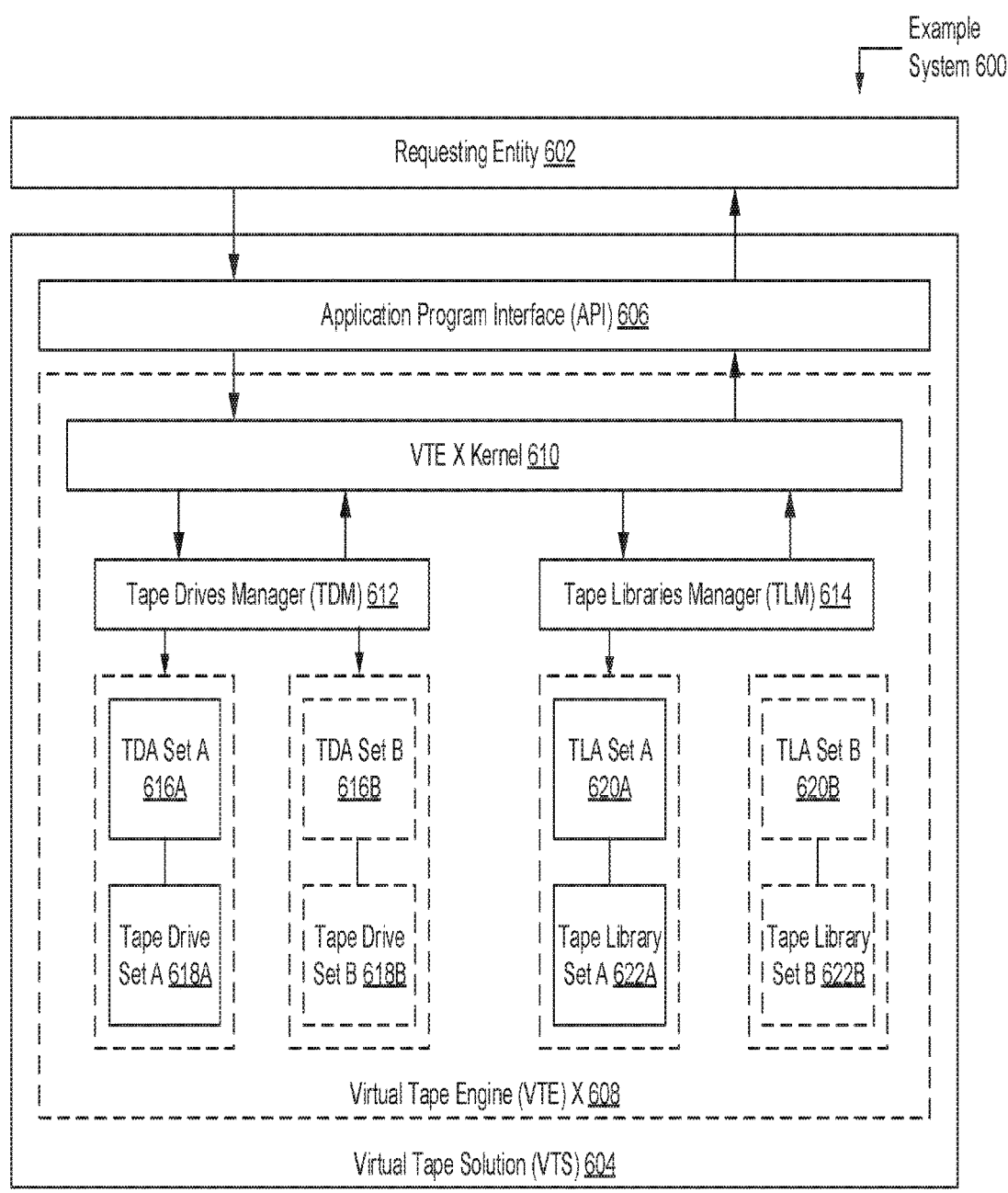
FIG. 6 shows an example system in accordance with one or more embodiments of the invention.

FIG. 6 shows an example system in accordance with one or more embodiments of the invention. The following example, presented in conjunction with components shown in FIG. 6, is for explanatory purposes only and not intended to limit the scope of the invention.

Turning to FIG. 6, the example system (600) includes a requesting entity (602) operatively connected to a VTS (604). The VTS (604) includes an API (606) tasked with receiving requests from, as well as issuing responses to, the requesting entity (602). The VTS (604) further includes a VTE X (608) on which several components are executing. The components include, but may not be limited to, a VTE X kernel (610) in direct communication with the VTS API (606), a TDM (612), and a TLM (614). The TDM (612) subsequently manages a first set of TDAs (616A), which are responsible for a first set of tape drives (618A). Similarly, the TLM (614) manages a first set of TLAs (620A), which are responsible for a first set of tape libraries (622A).

Turning to the example, consider a scenario whereby the requesting entity (602) submits a user reconfiguration request to the VTS (604). Accordingly, the user reconfiguration request may be received by the VTS API (606) and may include an existing user ID—e.g., "user0123", and a new user specific configuration. The new user specific configuration may specify at least the following information: (i) a set of new library management information (LMI) used to configure a set of new virtual tape libraries (i.e., a second set of tape libraries (622B)); (ii) a cardinality of the set of new LMI; (iii) a set of new TDCs used to configure a set of new virtual tape drives (i.e., a second set of tape drives (618B)); and (iv) a cardinality of the set of new TDCs. The user reconfiguration request may further include a VTE ID—e.g., "vtex", associated with VTE X (608).

Upon receiving the user reconfiguration request, the VTS API (606) obtains an existing user specific configuration by performing a lookup of the UCT (see e.g., FIG. 3C) using the existing user ID. The VTS API (606) then issues an assessment request, including the new user specific configuration and the existing user specific configuration, to the VTE X kernel (610) executing on VTE X (608). The VTS API (606) may identify VTE X (608) as the appropriate VTE to which the assessment request is pushed using the VTE ID included in the user reconfiguration request. In receiving the assessment request, the VTE X kernel (610) delegates the assessment request to the TDM (612) and the TLM (614). Specifically, the VTE X kernel (610) may delegate a portion of the assessment request pertaining to tape drives implementation specified in the new user specific configuration versus the existing user specific configuration to the TDM (612). Similarly, the VTE X kernel (610) may delegate another portion of the assessment request pertaining to tape libraries implementation specified in the new user specific configuration versus the existing user specific configuration to the TLM (614).

In receiving their portion of the assessment request, the TDM (612) proceeds to perform their respective assessment by comparing the non-overlapping computing resources that may be expended by the implementation of a second set of tape drives (618B) and a second set of TDAs (616B) specified in the new user specific configuration with the availability of non-overlapping computing resources remaining on VTE X (608). The assessment performed by the TDM (612) may further account for non-overlapping computing resources that may become available after deallocation of the first set of tape drives (618A) and the first set of TDAs (616A) representative of the existing user specific configuration. In concluding their respective assessment, the TDM (612) also determines that the available, and/or soon to be available, non-overlapping computing resources reserved for tape drives implementation are sufficient to fulfill at least the tape drives portion of the new user specific configuration without burdening the performance of other computing resources allocated to other mainframe users. Based on these aforementioned activities, the TDM (612) returns a request report back to the VTE X kernel (610) indicating a positive assessment.

Similarly, in receiving their portion of the assessment request, the TLM (614) proceeds to perform their respective assessment by comparing the non-overlapping computing resources that may be expended by the implementation of a second set of tape libraries (622B) and a second set of TLAs (620B) specified in the new user specific configuration with the availability of non-overlapping computing resources remaining on VTE X (608). The assessment performed by the TLM (614) may further account for non-overlapping computing resources that may become available after deallocation of the first set of tape libraries (622A) and the first set of TLAs (620A) representative of the existing user specific configuration. In concluding their respective assessment, the TLM (612) also determines that the available, and/or soon to be available, non-overlapping computing resources reserved for tape libraries implementation are sufficient to fulfill at least the tape libraries portion of the new user specific configuration without burdening the performance of other computing resources allocated to other mainframe users. Based on these aforementioned activities, the TLM (614) returns a request report back to the VTE X kernel (610) indicating a positive assessment.

Subsequently, the VTE X kernel (610) relays the request reports, indicating positive assessments, issued by the TDM (612) and the TLM (614), to the VTS API (606). Further, based on the received positive assessments, the VTS API (606) determines that implementation of the new user specific configuration is feasible. Accordingly, the VTS API (606) obtains a set of existing tape drive IDs from the UCT entry in the UCT associated with the existing user ID. The VTS API (606) then generates a first DBR using the set of existing tape drive IDs. The first DBR includes a set of tape drive removal requests, wherein the cardinality of the set of tape drive removal requests equals the cardinality of the set of existing tape drive IDs, and wherein each tape drive removal request includes one existing tape drive ID of the set of existing tape drive IDs. After generating the first DBR, the VTS API (606) provides the first DBR to VTE X (608), or more specifically, to the VTE X kernel (610) executing thereon.

Upon receiving the first DBR, the VTE X kernel (610) delegates the first DBR to the TDM (612). In receiving the first DBR, the TDM (612) identifies the first set of TDAs (616A) by performing a lookup of the DCT (see e.g., FIG. 3A) using the set of existing tape drive IDs (which are associated with the first set of tape drives (618A)). After identifying the first set of TDAs (616A), the TDM (612) establishes a connection with each TDA in the first set of TDAs (616A) and issues a shutdown command to each TDA. In response to the shutdown command, each TDA of the first set of TDAs (616A) readies their respective existing tape drive of the first set of tape drives (618A) for deletion. Readying an existing tape drive may entail cleaning up the existing tape drive and setting the current usage state of the existing tape drive to a dead state. After readying their respective existing tape drive, each TDA of the first set of TDAs (616A) subsequently self-terminates, thereby removing themselves from VTE X (608). Based on the dead states of the first set of tape drives (618A), the TDM (612) then proceeds to delete each existing tape drive in the first set of tape drives (618A) from VTE X (608). After deleting the first set of tape drives (618A), the TDM (612) updates the DCT and/or other data structures to remove mention of the first set of TDAs (616A) and the first set of tape drives (618A). After successfully fulfilling the first DBR, the TDM (612) issues a request report to the VTE X kernel (610).

In receiving the request report from the TDM (612), the VTE X kernel (610) relays the request report to the VTS API (606). Subsequently, the VTS API (606) obtains a set of existing tape library IDs from the UCT entry in the UCT associated with the existing user ID. The VTS API (606) then generates a first LBR using the set of existing tape library IDs. The first LBR includes a set of tape library removal requests, wherein the cardinality of the set of tape library removal requests equals the cardinality of the set of existing tape library IDs, and wherein each tape library removal request includes one existing tape library ID of the set of existing tape library IDs. After generating the first LBR, the VTS API (606) provides the first LBR to VTE X (608), or more specifically, to the VTE X kernel (610) executing thereon.

Upon receiving the first LBR, the VTE X kernel (610) delegates the first LBR to the TLM (614). In receiving the first LBR, the TLM (614) identifies the first set of TLAs (620A) by performing a lookup of the LCT (see e.g., FIG. 3B) using the set of existing tape library IDs (which are associated with the first set of tape libraries (622A)). After identifying the first set of TLAs (620A), the TLM (614) establishes a connection with each TLA in the first set of TLAs (620A) and issues a shutdown command to each TLA. In response to the shutdown command, each TLA of the first set of TLAs (620A) deletes their respective existing tape library of the first set of tape libraries (622A). After deleting their respective existing tape library, each TLA of the first set of TLAs (620A) subsequently self-terminates, thereby removing themselves from VTE X (608). The TLM (614) then updates the LCT and/or other data structures to remove mention of the first set of TLAs (620A) and the first set of tape libraries (622A). After successfully fulfilling the first LBR, the TLM (614) issues a request report to the VTE X kernel (610).

In receiving the request report from the TLM (614), the VTE X kernel (610) relays the request report to the VTS API (606). In response to the successful processing of the first DBR and the first LBR, the VTS API (606) generates a second LBR based on the new user specific configuration. The second LBR includes a set of tape library addition requests, wherein the cardinality of the set of tape library addition requests equals the cardinality of the set of new LMI specified in the new user specific configuration, and wherein each tape library addition request includes one new LMI of the set of aforementioned new LMI. After generating the second LBR, the VTS API (606) provides the second LBR to VTE X (608), or more specifically, to the VTE X kernel (610) executing thereon. In receiving the second LBR, the VTE X kernel (610) validates the second LBR by checking each new LMI enclosed in each tape library addition request for errors. After determining that zero errors or deficiencies were detected across all new LMI, the VTE X kernel (610) delegates the second LBR to the TLM (614).

Upon obtaining the second LBR, the TLM (614) proceeds to pause the library scanning process (not shown) executing on VTE X (608). After pausing the library scanning process, the TLM (614) creates each new tape library of the second set of tape libraries (622B) using a different new LMI of the set of new LMI specified in the second LBR. The TLM (614) then updates the LCT to include mention of the second set of tape libraries (622B) and the second set of TLAs (620B) yet to be created. After updating the LCT, the TLM (614) subsequently creates each new TLA of the second set of TLAs (620B) using at least a portion of each different new LMI. After successfully fulfilling the second LBR, the TLM (614) issues a request report to the VTE X kernel (610). The request report may include a set of new tape library IDs associated with the second set of tape libraries (622B).

In receiving the request report from the TLM (614), the VTE X kernel (610) relays the request report to the VTS API (606). The VTS API (606) then generates a second DBR based on the new user specific configuration. The second DBR includes a set of tape drive addition requests, wherein the cardinality of the set of tape drive addition requests equals the cardinality of the set of new TDCs specified in the new user specific configuration, and wherein each tape drive addition request includes one new TDC of the set of aforementioned new TDCs. After generating the second DBR, the VTS API (606) provides the second DBR to VTE X (608), or more specifically, to the VTE X kernel (610) executing thereon. In receiving the second DBR, the VTE X kernel (610) validates the second DBR by checking each new TDC enclosed in each tape drive addition request for errors. After determining that zero errors or deficiencies were detected across all new TDCs, the VTE X kernel (610) delegates the second DBR to the TDM (612).

Upon obtaining the second DBR, the TDM (612) updates the DCT to include mention of the yet to be created second set of tape drives (618B) and the yet to be created second set of TDAs (616B). After updating the DCT, the TDM (612) creates each new tape drive of the second set of tape drives (618B) using a different new TDC of the set of new TDCs specified in the second DBR. Subsequently, the TDM (612) creates each new TDA of the second set of TDAs (616B) using at least a portion of each different new TDC. After successfully fulfilling the second DBR, the TDM (612) issues a request report to the VTE X kernel (610). The request report may include a set of new tape drive IDs associated with the second set of tape drives (618B).

In receiving the request report from the TDM (612), the VTE X kernel (610) relays the request report to the VTS API (606). In response to the successful processing of the second LBR and the second DBR, the VTS API (606) updates the UCT entry associated with the existing user ID to: (i) replace the existing user specific configuration with the new user specific configuration; (ii) replace the set of existing tape drive IDs with the set of new tape drive IDs (provided by the TDM (612)); and (iii) replace the set of existing tape library IDs with the set of new tape library IDs (provided by the TLM (614)). After updating the UCT, the VTS API (606) issues a user reconfiguration response, to the requesting entity (602), indicating that fulfillment of the received user reconfiguration request was successful.

Figure 7:
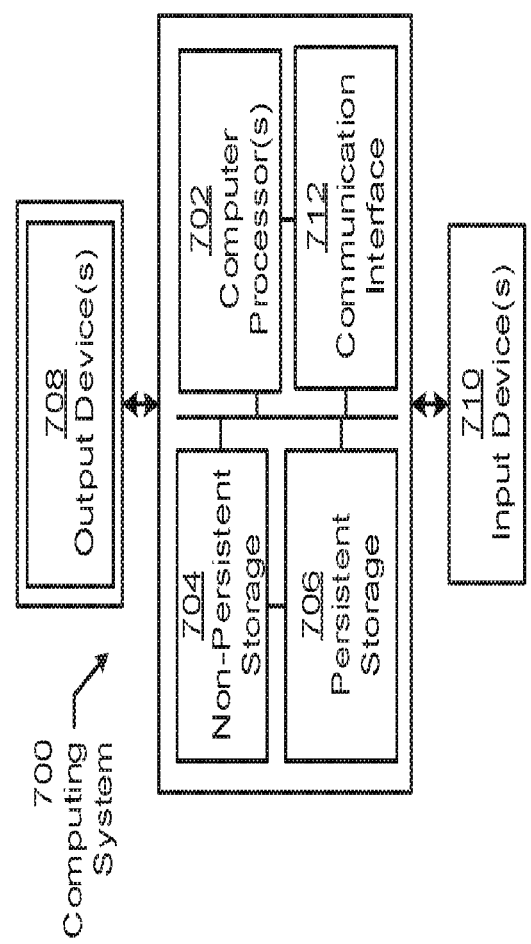
FIG. 7 shows a computing system in accordance with one or more embodiments of the invention.

Embodiments of the invention may be implemented on a computing system. Any combination of mobile, desktop, server, router, switch, embedded device, or other types of hardware may be used. For example, as shown in FIG. 7, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Embodiments of the invention provide a mechanism for multiple coexisting configurations support in virtual tape applications. The mechanism entails the non-disruptive introduction or modification of user specific configurations implemented on VTEs. The introduction or modification of a user specific configuration (pertaining to a mainframe user) non-disruptively refers to the implementation of the user specific configuration, by way of removing and/or adding virtual tape drives and virtual tape libraries: (i) without requiring the shutdown and restarting of the VTS and subsequently the VTEs executing thereon; and (ii) without compromising the performance of computing resources allocated towards the existing implementation of other existing user specific configurations (pertaining to other mainframe users) on the VTEs. Prior to the invention disclosed herein, changes (i.e., introduction or modification) to a user specific configuration would require at least the shutdown of the VTEs forming the VTS. This was the case because configuration information detailing changes to a user specific configuration had to be predefined in a configuration file that was only read once upon starting up (or initializing) the VTS. Further, prior to the invention disclosed herein, the aforementioned configuration information pertaining to user specific configurations could not be altered after initialization of the VTS. The shutdown and restarting of the VTS translated to the disruption of all work executing on the mainframe (operatively connected to the VTS) each time a user specific configuration was to be introduced or modified, which proved to be impractical and inefficient.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for supporting coexisting user specific configurations, comprising:
    receiving a request comprising a new user identifier (ID) and a new user specific configuration associated with a new mainframe user;
    in response to receiving the request:
        generating a library batch request (LBR) based on at least a portion of the new user specific configuration;
        making a first determination that the LBR is valid;
        processing, based on the first determination, the LBR to create a set of new virtual tape libraries;
        generating a drive batch request (DBR) based on at least another portion of the new user specific configuration;
        making a second determination that the DBR is valid; and
        processing, based on the second determination, the DBR to create a set of new virtual tape drives.

2. The method of claim 1, wherein the LBR comprises a set of tape library addition requests, wherein each tape library addition request of the set of tape library addition requests comprises a different new library management information (LMI) to configure one new virtual tape library of the set of new virtual tape libraries.

3. The method of claim 2, wherein making the first determination, comprises:
    for each tape library addition request of the set of tape library addition requests included in the LBR:
        inspecting the different new LMI included in the tape library addition request for deficiencies;
        detecting, based on the inspecting, that the different new LMI exhibits zero deficiencies; and
    determining, based on a set of different new LMIs collectively exhibiting zero deficiencies, that the LBR is valid.

4. The method of claim 2, wherein making the first determination, comprises:
    identifying a set of available, non-overlapping computing resources;
    identifying, from the set of available, non-overlapping computing resources, a subset of available, non-overlapping computing resources reserved for implementing new virtual tape libraries;
    for each tape library addition request of the set of tape library addition requests included in the LBR:
        estimating a set of non-overlapping computing resources required to fulfill the tape library addition request;
    deriving, from estimating the sets of non-overlapping computing resources, an overall set of non-overlapping computing resources required to fulfill the LBR; and
    determining, based on the subset of available, non-overlapping computing resources reserved for implementing new virtual tape libraries exceeding the overall set of non-overlapping computing resources required to fulfill the LBR, that the LBR is valid.

5. The method of claim 1, wherein processing the LBR to create the set of new virtual tape libraries, comprises:
    pausing a library scanning process monitoring for new mount points associated with creating virtual tape libraries;
    after the pausing:
        creating each new virtual tape library of the set of new virtual tape libraries using a different new library management information (LMI) of a set of new LMI included in the LBR;
        updating a library control table (LCT) to include a set of mappings, wherein each mapping of the set of mappings relates a new tape library ID associated with one new virtual tape library of the set of new virtual tape libraries to a new tape library agent (TLA) ID to be associated with one new TLA of a set of new TLAs;
        creating, after updating the LCT, the set of new TLAs, wherein each new TLA of the set of new TLAs is configured, based on at least a portion of one different new LMI, to manage one new virtual tape library of the set of new virtual tape libraries; and
    resuming, after creating the set of new TLAs, the library scanning process.

6. The method of claim 1, wherein the DBR comprises a set of tape drive addition requests, wherein each tape drive addition request of the set of tape drive addition requests comprises a different new tape drive configuration (TDC) to configure one new virtual tape drive of the set of new virtual tape drives.

7. The method of claim 6, wherein making the second determination, comprises:
    for each tape drive addition request of the set of tape drive addition requests included in the DBR:
        inspecting the different new TDC included in the tape drive addition request for deficiencies;
        detecting, based on the inspecting, that the different new TDC exhibits zero deficiencies; and
    determining, based on a set of different new TDCs collectively exhibiting zero deficiencies, that the DBR is valid.

8. The method of claim 6, wherein making the second determination, comprises:

identifying a set of available, non-overlapping computing resources;

identifying, from the set of available, non-overlapping computing resources, a subset of available, non-overlapping computing resources reserved for implementing new virtual tape drives;

for each tape drive addition request of the set of tape drive addition requests included in the DBR:
estimating a set of non-overlapping computing resources required to fulfill the tape drive addition request;

deriving, from estimating the sets of non-overlapping computing resources, an overall set of non-overlapping computing resources required to fulfill the DBR; and determining, based on the subset of available, non-overlapping computing resources reserved for implementing new virtual tape drives exceeding the overall set of non-overlapping computing resources required to fulfill the DBR, that the DBR is valid.

9. The method of claim 1, wherein processing the DBR to create the set of new virtual tape drives, comprises:
updating a drive control table (DCT) to include a set of mappings, wherein each mapping of the set of mappings relates a new tape drive ID associated with one new virtual tape drive of the set of new virtual tape drives to a new tape drive agent (TDA) ID to be associated with one new TDA of a set of new TDAs;

creating, after updating the DCT, each new virtual tape drive of the set of new virtual tape drives using a different new tape drive configuration (TDC) of a set of new TDCs included in the DBR;

creating the set of new TDAs, wherein each new TDA of the set of new TDAs is configured, based on at least a portion of one different new TDC, to manage one new virtual tape drive of the set of new virtual tape drives; and establishing a set of connections operatively connecting the set of new virtual tape drives to a mainframe operated by at least the new mainframe user.

10. A system, comprising:
a requesting entity; and
a virtual tape solution (VTS) operatively connected to the requesting entity, and programmed to:
receive, from the requesting entity, a request comprising a new user identifier (ID) and a new user specific configuration associated with a new mainframe user;
in response to receiving the request:
generate a library batch request (LBR) based on at least a portion of the new user specific configuration;
make a first determination that the LBR is valid;
process, based on the first determination, the LBR to create a set of new virtual tape libraries;
generate a drive batch request (DBR) based on at least another portion of the new user specific configuration;
make a second determination that the DBR is valid; and
process, based on the second determination, the DBR to create a set of new virtual tape drives.

11. The system of claim 10, wherein the VTS comprises a plurality of virtual tape engines (VTEs), wherein the set of new virtual tape libraries and the set of new virtual tape drives are created on a VTE of the plurality of VTEs.

12. The system of claim 11, wherein each VTE of the plurality of VTEs is a server.

13. The system of claim 11, wherein the VTE comprises a VTE kernel, wherein at least the first determination and the second determination are performed by the VTE kernel.

14. The system of claim 13, wherein the VTE further comprises a tape libraries manager (TLM) operatively connected to the VTE kernel, wherein processing of the LBR to create the set of new virtual tape libraries is performed by the TLM.

15. The system of claim 13, wherein the VTE further comprises a tape drives manager (TDM) operatively connected to the VTE kernel, wherein processing of the DBR to create the set of new virtual tape drives is performed by the TDM.

16. The system of claim 11, wherein creating the set of new virtual tape libraries and creating the set of new virtual tape drives comprises not restarting the plurality of VTEs.

17. The system of claim 10, further comprising:
a mainframe operatively connected to the VTS, wherein the mainframe is operated at least by the new mainframe user; and
a storage system operatively connected to the VTS and comprising a plurality of tape volume images.

18. A non-transitory computer readable medium (CRM) comprising computer readable program code, which when executed by a computer processor, enables the computer processor to:
receive a request comprising a new user identifier (ID) and a new user specific configuration associated with a new mainframe user;
in response to receiving the request:
generate a library batch request (LBR) based on at least a portion of the new user specific configuration;
make a first determination that the LBR is valid;
process, based on the first determination, the LBR to create a set of new virtual tape libraries;
generate a drive batch request (DBR) based on at least another portion of the new user specific configuration;
make a second determination that the DBR is valid; and
process, based on the second determination, the DBR to create a set of new virtual tape drives.

19. The non-transitory CRM of claim 18, wherein the LBR comprises a set of tape library addition requests, wherein each tape library addition request of the set of tape library addition requests comprises a different new library management information (LMI) to configure one new virtual tape library of the set of new virtual tape libraries.

20. The non-transitory CRM of claim 18, wherein the DBR comprises a set of tape drive addition requests, wherein each tape drive addition request of the set of tape drive addition requests comprises a different new tape drive configuration (TDC) to configure one new virtual tape drive of the set of new virtual tape drives.

* * * * *